(12) United States Patent
Takahashi et al.

(10) Patent No.: US 10,886,828 B2
(45) Date of Patent: Jan. 5, 2021

(54) VIBRATION ACTUATOR AND PORTABLE DEVICE

(71) Applicants: Yuki Takahashi, Tokyo (JP); Kazutaka Sakaguchi, Tokyo (JP); Yasutaka Kitamura, Tokyo (JP); Shigeyuki Shimomura, Tokyo (JP); Yuki Ogihara, Tokyo (JP)

(72) Inventors: Yuki Takahashi, Tokyo (JP); Kazutaka Sakaguchi, Tokyo (JP); Yasutaka Kitamura, Tokyo (JP); Shigeyuki Shimomura, Tokyo (JP); Yuki Ogihara, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 81 days.

(21) Appl. No.: 16/234,634

(22) Filed: Dec. 28, 2018

(65) Prior Publication Data
US 2019/0207496 A1    Jul. 4, 2019

(30) Foreign Application Priority Data
Dec. 28, 2017   (JP) ................. 2017-254218

(51) Int. Cl.
*H02K 33/02* (2006.01)
*G06F 3/01* (2006.01)
(Continued)

(52) U.S. Cl.
CPC ............. *H02K 33/02* (2013.01); *G06F 3/016* (2013.01); *H02K 33/18* (2013.01); *G08B 6/00* (2013.01); *H04M 19/047* (2013.01)

(58) Field of Classification Search
CPC ........ H02K 33/02; H02K 33/18; H02K 33/00; G06F 3/016; G06F 1/163; G06F 1/1626; G06F 1/1684; H04M 19/047; G08B 6/00
(Continued)

(56) References Cited

U.S. PATENT DOCUMENTS 6,590,991 B1 *   7/2003   Maeda .................. H02K 33/06
                                                       381/409
8,129,870 B1 *   3/2012   Pusl ...................... H02K 33/16
                                                        310/15
(Continued)

FOREIGN PATENT DOCUMENTS

JP           4875133 B2     2/2012
JP       2015-095943 A      5/2015
(Continued)

*Primary Examiner* — John K Kim
(74) *Attorney, Agent, or Firm* — Brundidge & Stanger, P.C.

(57) ABSTRACT

A vibration actuator includes: a fixing part including one of a coil and a magnet; a movable part including the other one of the coil and the magnet; and an elastic supporting part configured to support the movable part movably with respect to the fixing part. The movable part is configured to reciprocate with respect to the fixing part in a vibration direction through cooperation between the powered coil and the magnet. The magnet is disposed away from and radially inside the coil. The elastic supporting part has a plate-like shape in which one end of the elastic supporting part is fixed to the fixing part at the side of the movable part and the other end is fixed to the movable part, and cantilevers the movable part in such a manner that the movable part can reciprocate in the vibration direction.

7 Claims, 16 Drawing Sheets

(51) Int. Cl.
  *H02K 33/18* (2006.01)
  *H04M 19/04* (2006.01)
  *G08B 6/00* (2006.01)

(58) Field of Classification Search
  USPC .......................................................... 310/29
  See application file for complete search history.

(56) References Cited

U.S. PATENT DOCUMENTS

| | | | |
|---|---|---|---|
| 9,590,463 B2* | 3/2017 | Kuroda | H02K 1/06 |
| 10,610,894 B2* | 4/2020 | Takahashi | B06B 1/045 |
| 2007/0164616 A1* | 7/2007 | Kuwabara | B06B 1/045 |
| | | | 310/15 |
| 2011/0101796 A1 | 5/2011 | Odajima et al. | |
| 2015/0137627 A1 | 5/2015 | Katada et al. | |
| 2016/0254736 A1* | 9/2016 | Jin | H02K 33/18 |
| | | | 310/25 |
| 2019/0207496 A1* | 7/2019 | Takahashi | G06F 1/1684 |

FOREIGN PATENT DOCUMENTS

| JP | 2015-112013 A | 6/2015 |
|---|---|---|
| JP | 2016-221495 A | 12/2016 |
| JP | 2016-226247 A | 12/2016 |

* cited by examiner

VIBRATION ACTUATOR AND PORTABLE DEVICE

CROSS REFERENCE TO RELATED APPLICATIONS

This application is entitled to the benefit of Japanese Patent Application No. 2017-254218, filed on Dec. 28, 2017, the disclosure of which including the specification, drawings and abstract is incorporated herein by reference in its entirety.

TECHNICAL FIELD

The present invention relates to a vibration actuator and a portable device.

BACKGROUND ART

Conventionally, a vibration actuator has been mounted in a portable device as a vibration source for notifying an incoming call by transmitting vibrations to a finger, a limb, or the like, and for improving the operational feeling on a touch panel and the realism of an amusement machine such as a controller of a game machine. It should be noted that portable devices include wearable terminals attached to clothing, arms, and the like, in addition to portable communication terminals, such as mobile phones and smartphones, personal digital assistants, such as tablet PCs, portable game terminals, and controllers (game pads) of stationary game machines.

The vibration actuators disclosed in PTLs 1 to 3 include a fixing part having a coil and a movable part having a magnet, and cause the movable part to reciprocate by utilizing the driving force of a voice coil motor consisting of the coil and the magnet, thereby generating vibrations. These vibration actuators are linear actuators in which the movable part linearly moves along the shaft and are mounted in such a manner that the vibration direction is parallel to the main surface of a portable device. To the body surface of a user to be in contact with the portable device, vibrations in directions along the body surface are transmitted.

In the vibration motors disclosed in PTLs 4 and 5, the movable part has magnets vertically opposed with respect to the coil. The movable part is supported by a plate spring in which the main surface portion of the spring is parallel to the vertical direction, and vibrates in the lateral direction with the force generated between the coil and the magnet.

CITATION LIST

Patent Literature

PTL 1
Japanese Patent Application Laid-Open No. 2015-095943
PTL 2
Japanese Patent Application Laid-Open No. 2015-112013
PTL 3
Japanese Patent No. 4875133
PTL 4
Japanese Patent Application Laid-Open No. 2016-226247
PTL 5
Japanese Patent Application Laid-Open No. 2016-221495

SUMMARY OF INVENTION

Technical Problem

A portable device having a vibrating function is required to be able to give a user sufficient physically-felt vibrations. However, the vibration actuators disclosed in PTLs 1 to 5, which generate the vibrations in directions along the body surface, have a problem that they cannot give sufficient physically-felt vibrations. Besides, the configurations of PTLs 4 and 5, in which the coil and the magnet are vertically opposed, have a problem that the coil and the magnet need to have predetermined vertical thicknesses to give the user sufficient physically-felt vibrations, which makes it impossible to reduce the vertical thicknesses. Moreover, these vibration actuators have a problem that when the spring for supporting the movable part is attached to the basal plate of the fixing part, process marks made by the attachment are left on the basal plate, which interferes with attaching the vibration actuator on the flat plane of the basal plate.

An object of the present invention is to provide a vibration actuator and a portable device in which high flatness of the basal plate is ensured without an increase in size and which can give the user sufficient physically-felt vibrations.

Solution to Problem

In order to achieve the above object, the present invention provides a vibration actuator, including:
  a fixing part including one of a coil and a magnet;
  a movable part including the other one of the coil and the magnet; and
  an elastic supporting part configured to support the movable part movably with respect to the fixing part, in which
  the movable part is configured to reciprocate with respect to the fixing part in a vibration direction through cooperation between the coil supplied with electric power and the magnet,
  the magnet is disposed away from and radially inside the coil, and
  the elastic supporting part has a plate-like shape in which one end of the elastic supporting part is fixed to the fixing part at a side of the movable part and the other end is fixed to the movable part, and cantilevers the movable part in such a manner that the movable part can reciprocate in the vibration direction.

Advantageous Effects of Invention

The present invention can provide a vibration actuator and a portable device that can give sufficient physically-felt vibrations to the user while ensuring the flatness of the basal plate, without an increase in size.

DESCRIPTION OF EMBODIMENTS

Hereinafter, embodiments of the present invention will be described in detail with reference to the accompanying drawings.

Embodiment 1

[Overall Structure of Vibration Actuator 1]

Figure 1:
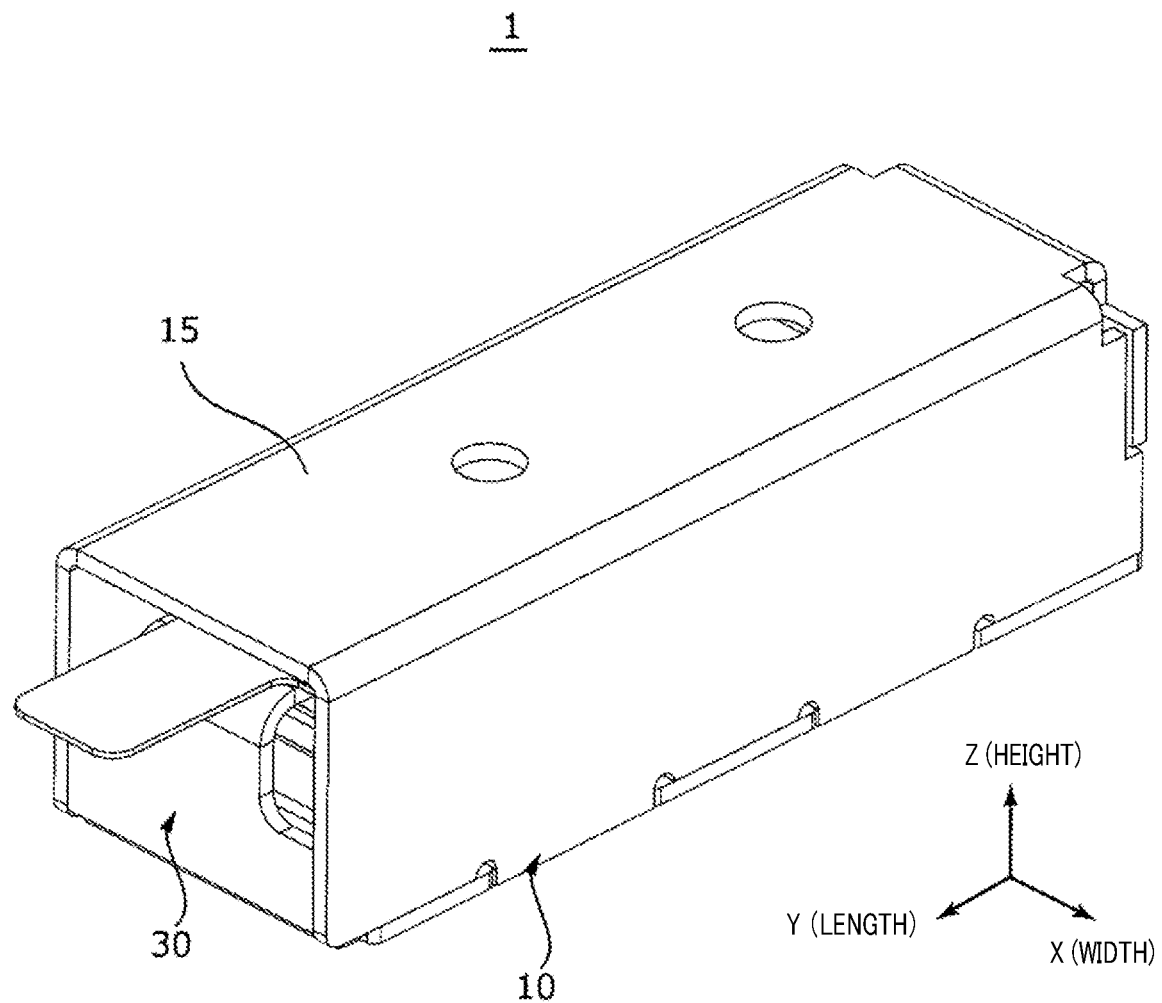
FIG. 1 is a perspective view of an external appearance of a vibration actuator according to Embodiment 1 of the present invention.
Figure 2:
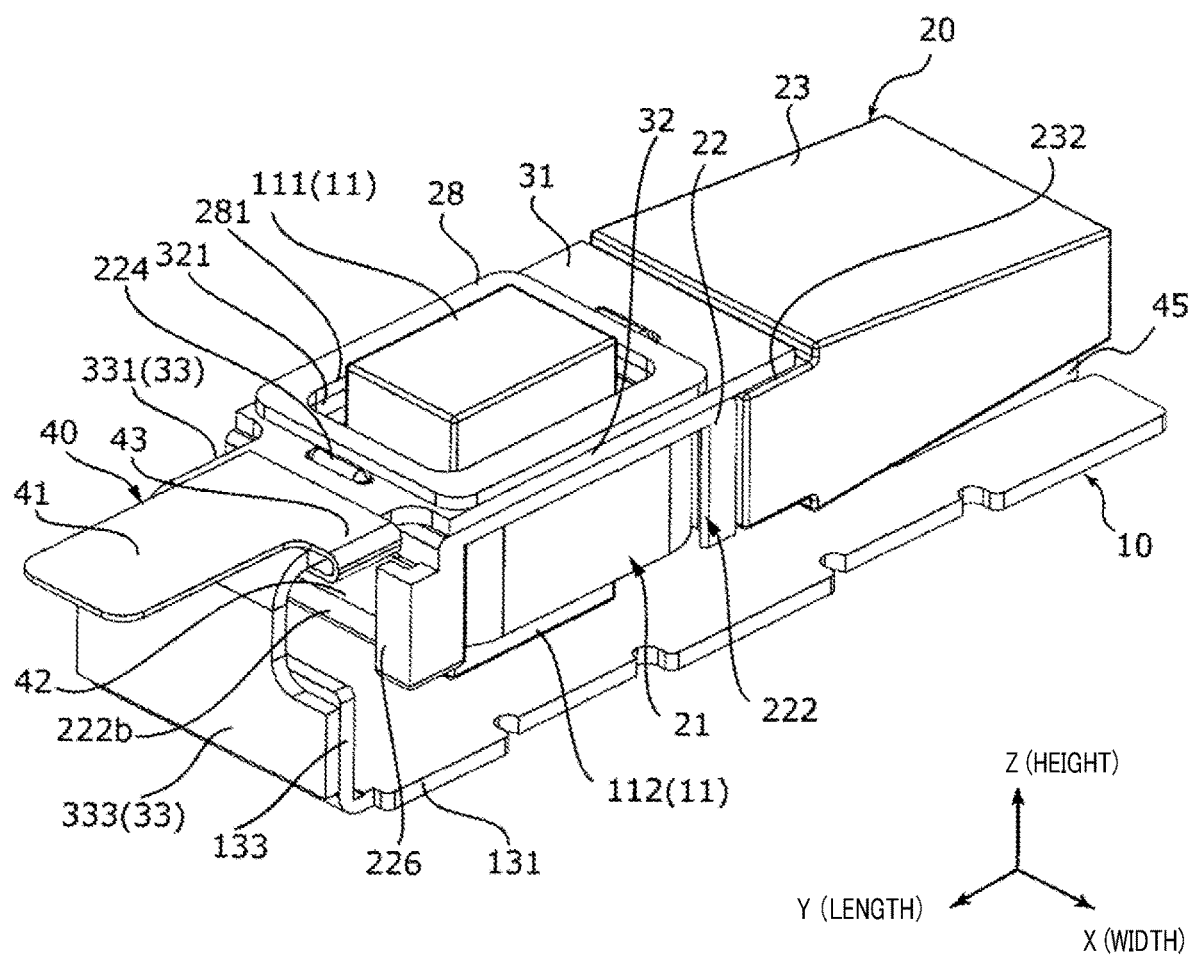
FIG. 2 is a perspective view showing a state in which the cover of the vibration actuator is removed.
Figure 3:
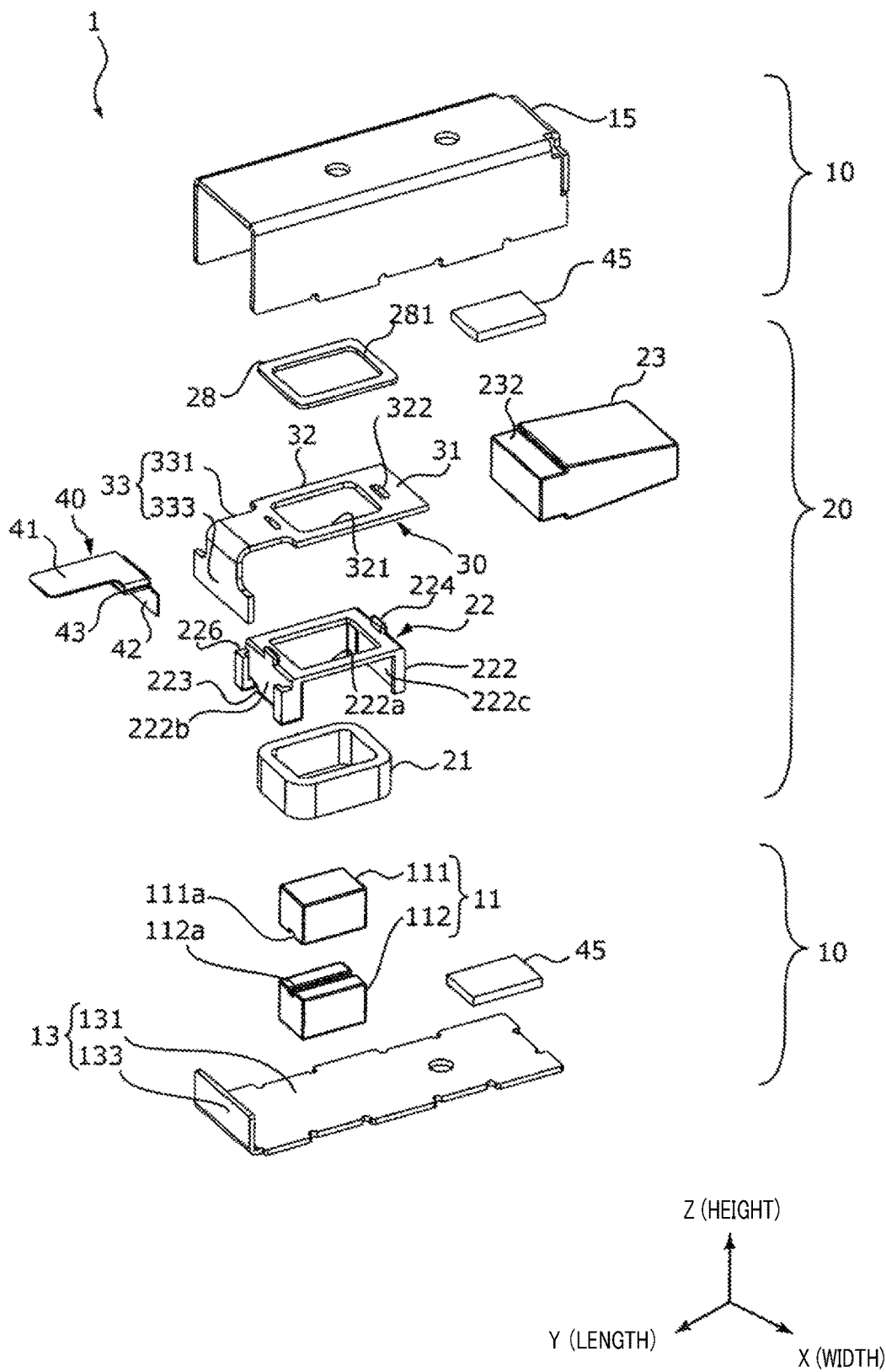
FIG. 3 is an exploded perspective view of the vibration actuator.
Figure 4:
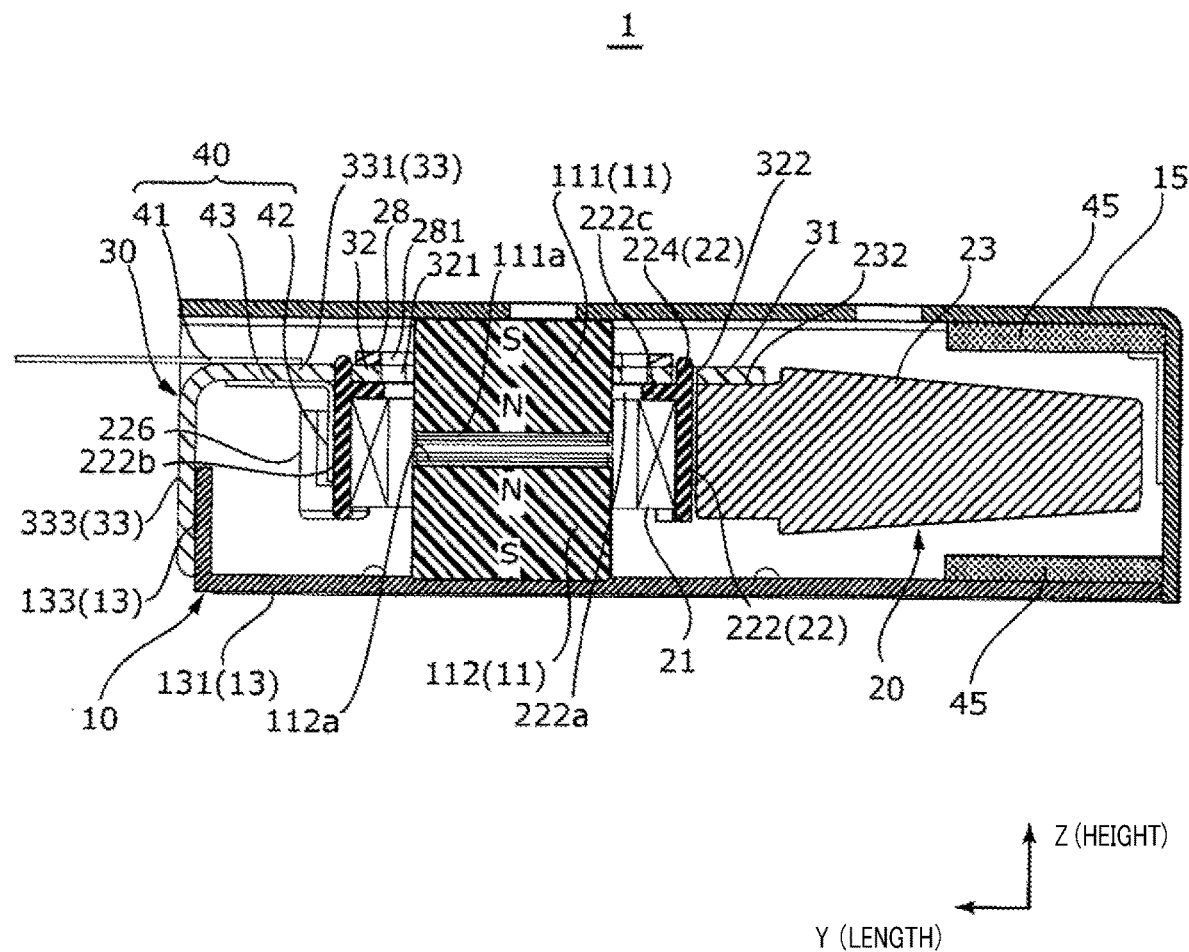
FIG. 4 is a longitudinal sectional view showing the structure of principal parts of the vibration actuator.
Figure 5:
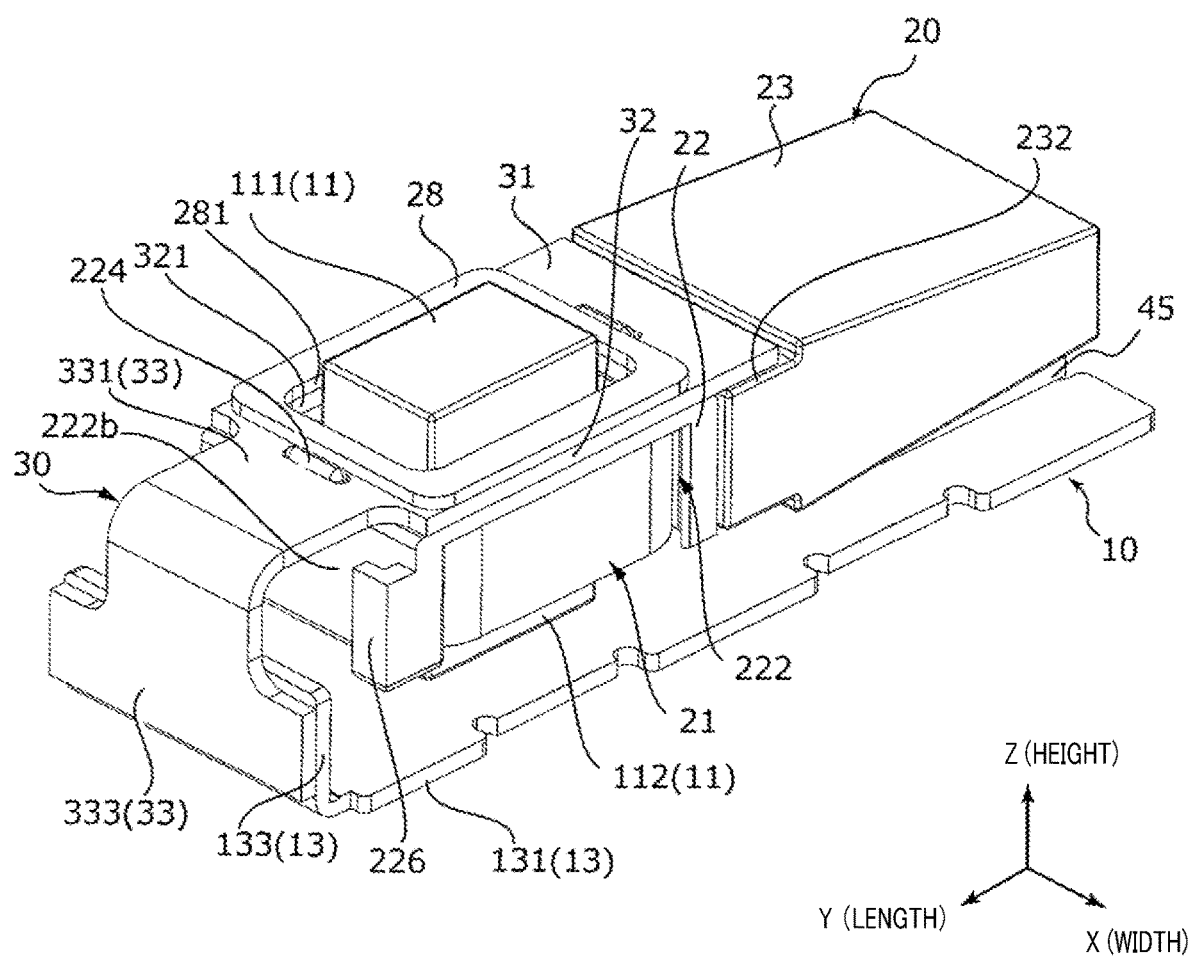
FIG. 5 is a perspective view showing a state in which the cover and FPC of the vibration actuator are removed.
Figure 6:
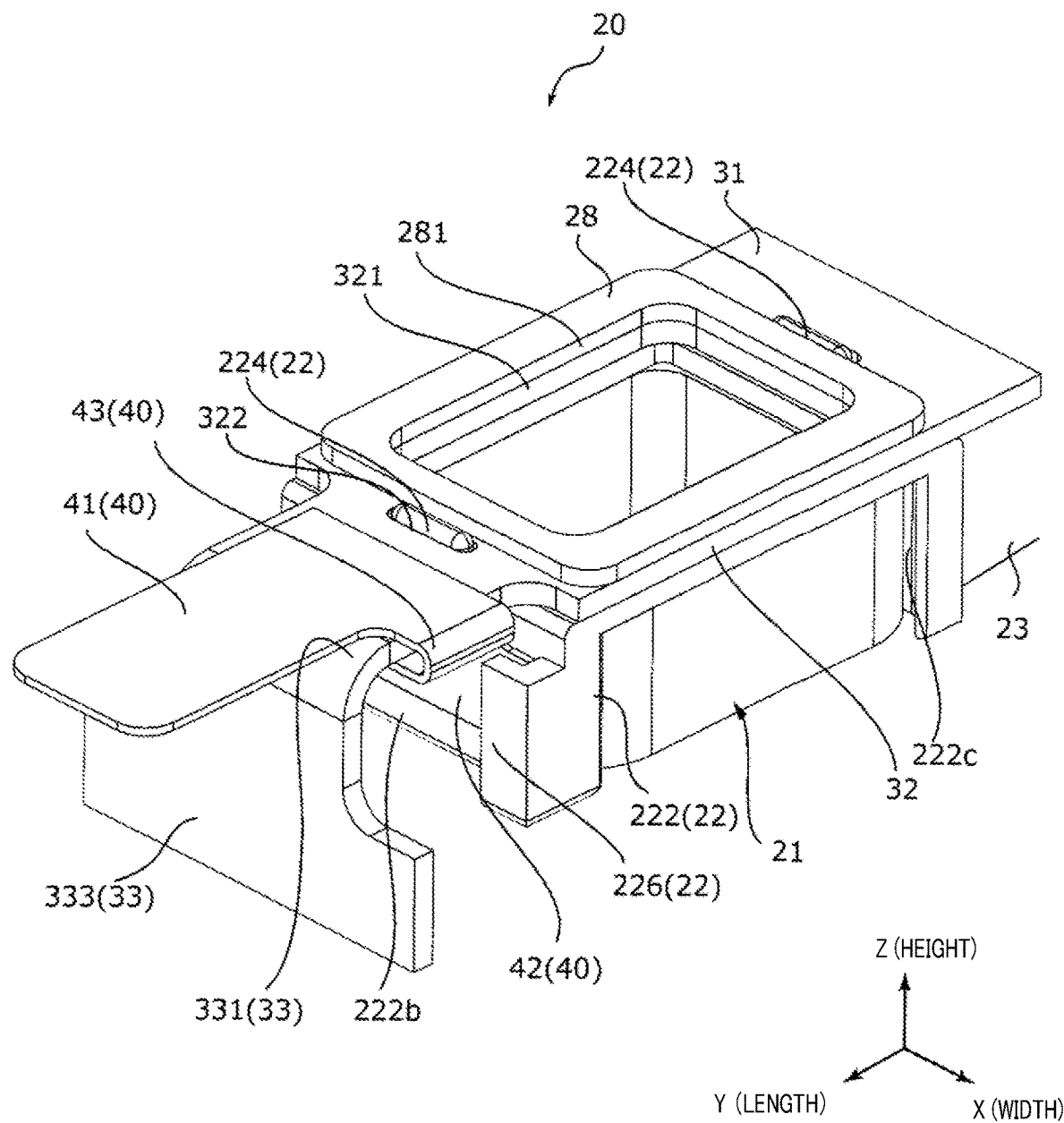
FIG. 6 is a perspective view showing the structure of principal parts of the movable part from which a weight is removed.
Figure 7:
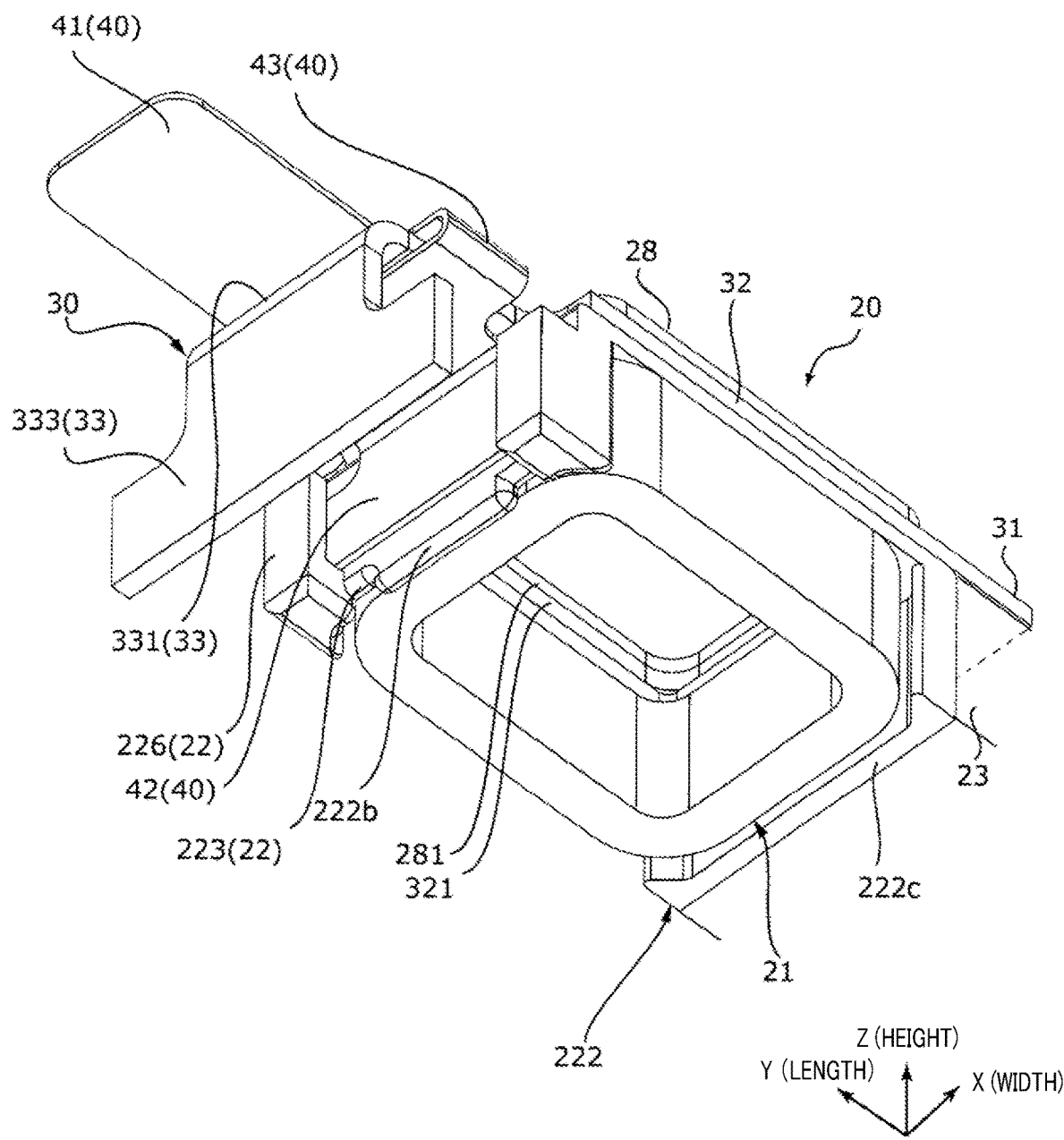
FIG. 7 is a bottom perspective view of the structure of the principal parts of the movable part shown in FIG. 6.

FIG. 1 is a perspective view of an external appearance of vibration actuator 1 according to Embodiment 1 of the present invention. FIG. 2 is a perspective view showing a state in which cover 15 of vibration actuator 1 is removed. FIG. 3 is an exploded perspective view of vibration actuator 1. FIG. 4 is a longitudinal sectional view showing the structure of principal parts of vibration actuator 1. FIG. 5 is a perspective view showing a state in which the cover actuator and the FPC of the vibration are removed, FIG. 6 is a perspective view showing the structure of the principal parts of the movable part from which the weight is removed, and FIG. 7 is a bottom perspective view of the principal parts of the movable part in FIG. 6.

In this embodiment, an orthogonal coordinate system (X, Y, Z) will be used for explanation. The drawings described below (including drawings used for explaining Embodiments 2 and 3) also use common orthogonal coordinate system (X, Y, Z). In the description below, the width, length, and height of vibration actuator 1 are lengths in direction X, direction Y, and direction Z, respectively. In addition, positive direction Z indicates "upper side", and negative direction Z indicates "lower side" for explanation. Further, a "side of the movable part" in this embodiment refers to a direction that is perpendicular to direction Z and extends radially from the movable part, in this embodiment, direction X, negative direction X, or direction Y extending radially from the movable part.

Vibration actuator 1 is mounted in a portable device, such as a smartphone (see FIGS. 16A and 16B), as a vibration source and implements the vibrating function of the portable device. Vibration actuator 1 is driven to vibrate, for example, for notifying a user of an incoming call or giving the user an operational feeling or realism. Vibration actuator 1 is mounted so that in a portable device, for example, the vibration transmitting surface to be in contact with the user is parallel to the XY face. In a portable device, such as a smartphone or tablet terminal, for example, the vibration transmitting surface is a touch panel face, and in a wearable terminal mounted on user's clothing or arms, it is an outer surface to be in contact with the clothing or arms (inner peripheral surface 605 in FIG. 16A).

As shown in FIGS. 1 to 4, vibration actuator 1 includes fixing part 10, movable part 20, and elastic supporting body 30. Fixing part 10 is coupled to movable part 20 through elastic supporting body 30 so that the other end reciprocates with one end as a fulcrum, and supports movable part 20.

In this embodiment, fixing part 10 has magnet 11, and movable part 20 has coil 21. In other words, vibration actuator 1 employs a voice coil motor (VCM) of a moving-coil system. It should be noted that vibration actuator 1 may use a voice coil motor of a moving-magnet system in which fixing part 10 has a coil and movable part 20 has a magnet.

[Fixing Part 10]

Fixing part 10 supports movable part 20 through elastic supporting body 30.

Fixing part 10 includes magnet 11, base plate 13, cover 15, and damper materials 45.

Base plate 13 is composed of a plate, such as a steel plate (a rectangular plate in this embodiment), and includes rectangular plate body 131 constituting the bottom face of vibration actuator 1, and a side end wall 133 with which one end of elastic supporting body 30 is fixed on a side (here, a back side) of movable part 20. It should be noted that side end wall 133 is disposed on the back side of movable part 20, side walls of cover 15 are disposed on sides opposed along the width, and a front end wall of cover 15 is disposed on a front end side opposed to the back side, that is, on a free end side.

First magnet 111 is fixed on plate body 131 and movable part 20 is opposed to and separated from plate body 131.

As shown in FIGS. 1 to 5, side end wall 133 in this embodiment is integrated with plate body 131 such that it curves and stands up from an end of plate body 131 on one side (on the back).

Side end wall 133 is opposed to and separated from an end surface on the base end side of movable part 20.

Cover 15 is compatible with base plate 13 and has a shape of a box (a cornered box in this embodiment) opened on base plate 13 side. Both side walls and a front end wall of cover 15 constitute a basal section (hereinafter referred to as "top section" for convenience), both side sections separated in the width direction, and a front end side section, which is a side section on the front end side, of vibration actuator 1.

Attaching cover 15 to base plate 13 forms a housing (case) in the shape of a box (cornered box in this embodiment) of vibration actuator 1. In this embodiment, vibration actuator 1, which may have any external shape and dimensions, is formed into a rectangular parallelepiped shape in which, among the width (direction X), the length (direction Y), and the height (direction Z), the length is longest and the height is shortest. Components, including movable part 20, are contained in a space defined by base plate 13 and cover 15.

Base plate 13 and cover 15 are preferably composed of a conductive material. Thus, base plate 13 and cover 15 serve as an electromagnetic shield, and serve as a yoke constituting a magnetic circuit together with magnet 11.

In addition, base plate 13 and cover 15 are each provided with damper material 45 to be in contact with vibrating movable part 20 on the free end side of movable part 20.

Figure 10A:
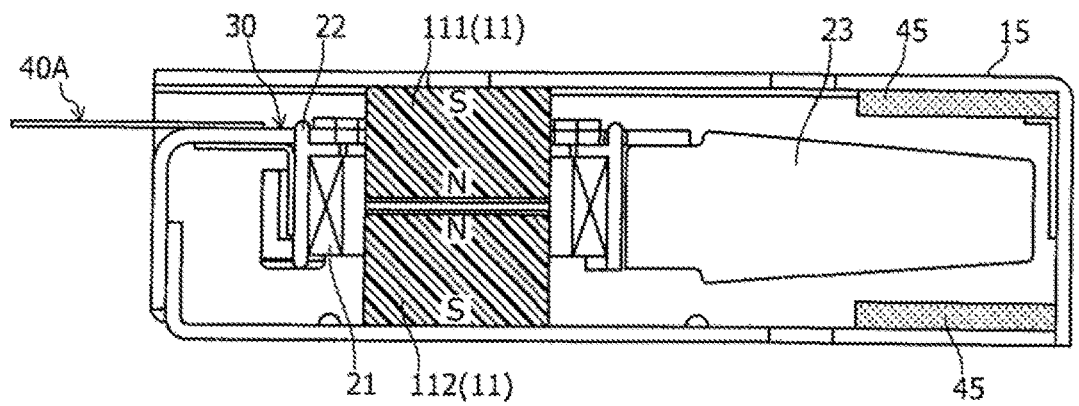
FIGS. 10A, 10B, and 10C are longitudinal sectional views showing the operation of the movable part.
Figure 10B:
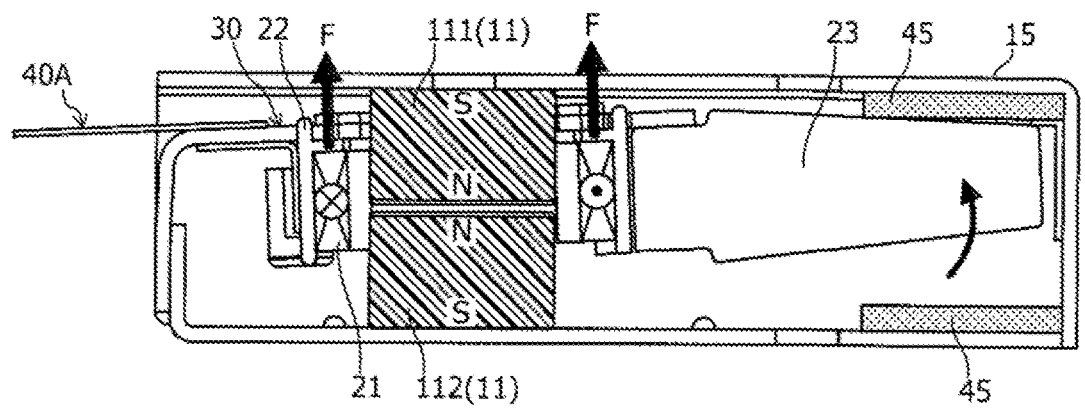
Figure 10C:
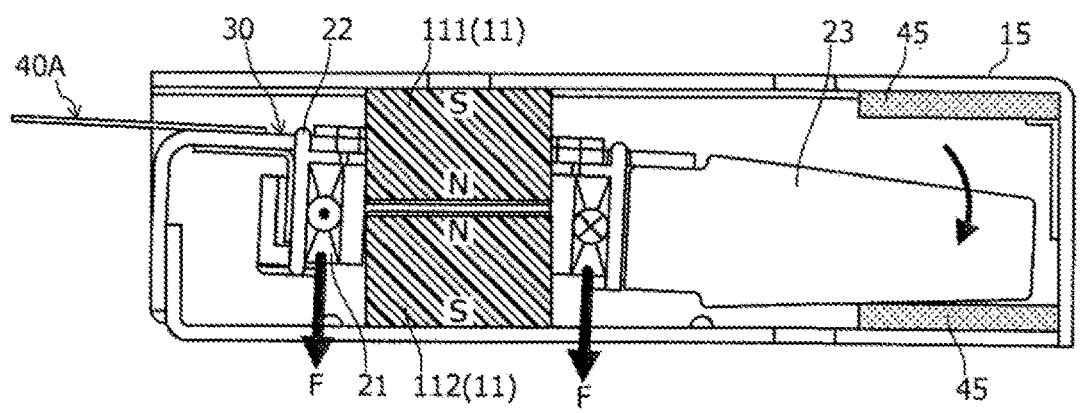

Damper materials 45 come in contact with weight 23 of movable part 20 when movable part 20 vibrates, thereby transmitting vibrations of movable part 20 to base plate 13 and cover 15 which serve as a housing of vibration actuator 1 (see FIGS. 10B and 10C). Hence, damper materials 45 can generate significant vibrations of the housing. Damper materials 45 are composed of a soft material, such as an elastomer, rubber, resin, or a porous elastic member (for example, sponge). In this embodiment, damper materials 45 are provided to base plate 13 and cover 15. Alternatively, damper materials 45 may be provided to movable part 20 side, here, weight 23, so that it comes in contact with base plate 13 and cover 15 when movable part 20 vibrates.

Magnet 11 consists of two magnets 111 and 112. Among magnets 111 and 112 in the state where vibration actuator 1 is assembled, magnet 111 located on the upper side (cover 15 side) is referred to as first magnet 111, and magnet 112 located on the lower side (base plate 13 side) is referred to as second magnet 112.

First magnet 111 and second magnet 112 have substantially the same shape (a rectangular parallelepiped having longer sides along the length direction in this embodiment) and are joined to each other in such a manner that their magnetization directions are opposite. In other words, first magnet 111 and second magnet 112 are opposed and joined to each other on the same magnetic pole. In this embodiment, first magnet 111 and second magnet 112 are joined to each other in such a manner that their magnetization directions are opposite. Alternatively, they may be separated from each other in such a manner that their magnetization directions are opposite.

In this embodiment, first magnet 111 and second magnet 112 are magnetized in such a manner that the north pole resides on the joining surface side and the south pole resides on cover 15 or base plate 13 side. It should be noted that "substantially the same" means that first magnet 111 and second magnet 112 have the same external shape but may have different structures in detail (for example, depressed portions 111a and 112a formed in the joining surface (see FIG. 3)).

In addition, first magnet 111 and second magnet 112 are located a predetermined distance away from coil 21 radially inside coil 21. Here, a "radial direction" refers to a direction orthogonal to the coil axis (direction Z). A "predetermined distance" refers to a distance within which movement (oscillation) of coil 21 in direction Z with respect to first magnet 111 and second magnet 112 is permitted. It should be noted that coil 21 is disposed in such a manner that its top flushes with a joint portion between first magnet 111 and second magnet 112 in the state where vibration actuator 1 is assembled.

In the case where first magnet 111 and second magnet 112 are magnetized in such a manner that the north pole resides on the joining surface side and the south pole resides on cover 15 or base plate 13 side, a magnetic flux emerging from a central portion of magnet 11 along direction Z (joint portion) and entering both ends distanced along direction Z (upper end and lower end) is formed. Consequently, an outward magnetic flux crosses every part of coil 21; thus, upon energization of coil 21, the Lorentz force acts in the same direction. For example, when coil 21 is energized as shown in FIG. 10B, the upward Lorentz force acts on coil 21. When coil 21 is energized as shown in FIG. 10C, the downward Lorentz force acts on coil 21.

First magnet 111 and second magnet 112 are joined to each other with an adhesive, for example. In other words, there is an adhesive layer (whose reference numeral is omitted) between first magnet 111 and second magnet 112. The adhesive used here may be composed of an ultraviolet-curable resin, thermosetting resin, or anaerobically-curable resin, for example. With an ultraviolet-curable adhesive (based on an acrylic resin or epoxy resin), which can be cured by ultraviolet irradiation in a short time, the takt time and the number of steps can be reduced. Meanwhile, with a thermosetting adhesive (based on an epoxy resin or acrylic resin) or anaerobically-curable adhesive (based on an acrylic resin), the bonding strength can be increased. In this embodiment, first magnet 111 and second magnet 112 are joined to each other with a thermosetting adhesive based on an epoxy resin. With an ultraviolet-curable adhesive, the central portion of the adhesive layer is barely irradiated with ultraviolet light, which may result in insufficient curing. Similarly, with an anaerobically-curable adhesive, magnet 11 is made compact and has a smaller area not exposed to air, which may result in insufficient curing. In contrast, with a thermosetting adhesive based on an epoxy resin, reliable curing can be achieved by heating, thereby stabilizing the manufacturing process and improving the productivity and reliability.

In this embodiment, first magnet 111 and second magnet 112 have depressed portions 111a and 112a in their joining surfaces, respectively. With this configuration, depressed portions 111a and 112a serve as a resin pit, thereby making an adhesion area greater and increasing the adhesive strength. Accordingly, the impact resistance is improved and the reliability increases. In addition, adhesive oozing is reduced and workability is therefore improved. Moreover, since depressed portions 111a and 112a are provide on magnetic pole surfaces that have the same magnetic poles, they can also be used as markings for identifying the magnetization directions of first magnet 111 and second magnet 112.

In the case where first magnet 111 and second magnet 112 are joined to each other with an adhesive in such a manner that their magnetization directions are opposite, an excessive amount of applied adhesive results in a larger gap between the magnets and affects the vibrational characteristics, or an insufficient amount of applied adhesive cannot provide adequate bonding strength, leaving the risk of damage in the magnets upon vibration. In this embodiment, such problems are solved by forming depressed portions 111a and 112a in the joining surfaces of first magnet 111 and second magnet 112, respectively.

Note that only at least one of first magnet 111 and second magnet 112 needs to have depressed portion 111a or 112a, and depressed portions 111a and 112a may have different shapes and may be formed into a cross shape instead of a linear shape which is adopted in this embodiment. Depressed portions 111a and 112a in a cross shape collect a larger amount of adhesive, so that the adhesive strength can be effectively made higher than in the case where they have a linear shape. On the other hand, depressed portions 111a and 112a in a linear shape are readily machinable, resulting in a stable shape, suppressing variations between individual workpieces, and imparting stable quality to magnet 11.

Second magnet 112 is fixed to a predetermined position on plate body 131 of base plate 13, for example, with a thermosetting adhesive such as an epoxy resin. In addition, first magnet 111 is fixed to a predetermined position on cover 15, for example, by inserting magnet 11 in movable part 20 and attaching cover 15 to the workpiece, and then injecting an adhesive from an injection hole (whose reference numeral is omitted) of cover 15.

[Movable Part 20]

Movable part 20 vibrates (oscillates) in vibration actuator 1 during operation. To be specific, with elastic supporting body 30, the free end of movable part 20 vibrates with respect to fixing part 10 in a direction orthogonal to the vibration transmitting surface, here, in the vertical direction corresponding to direction Z.

One end of movable part 20 (here, an end of coil holder 22 on the back) is coupled to side end wall 133 of base plate 13 of fixing part 10 through plate spring member 33 of elastic supporting body 30 at the side of movable part 20, and the other end is a free end. Movable part 20 is disposed inside the housing intermediately between base plate 13 and the top section of cover 15 in such a manner that it is cantilevered substantially parallel to base plate 13 and the top section of cover 15. In other words, elastic supporting body 30 has a structure for cantilevering movable part 20 movably in the vibration direction (direction Z).

Movable part 20 includes coil 21, coil holder 22, weight 23, and reinforcing member 28. In this embodiment, weight fixer member 31 and holder attaching member (movable part fixer member) 32 of elastic supporting body 30 (the details will be described later) also constitute movable part 20 and oscillate as movable part 20.

Movable part 20 faces base plate 13 and the top section of cover 15 in a non-energized state. When coil 21 is energized, movable part 20 reciprocates in the height direction (direction Z) to move toward and away from base plate 13 (specifically plate body 131) and the top section of cover 15 (see FIGS. 10B and 10C).

Figure 8:
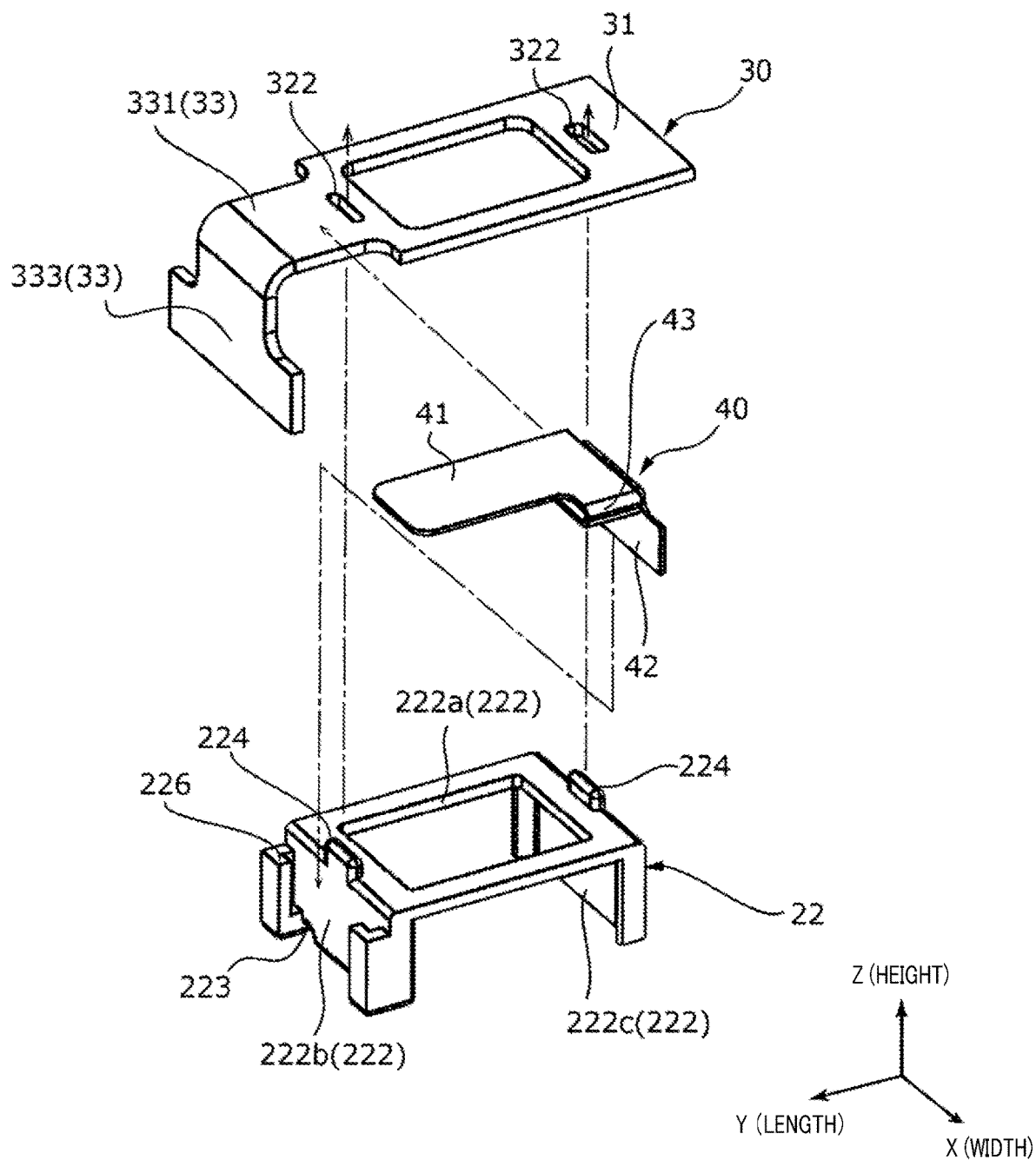
FIG. 8 is a diagram for explaining a mounting structure of the FPC, a coil holder, and an elastic supporting body.

FIG. 6 is a perspective view showing the structure of principal parts of movable part 20 from which weight 23 is removed, and FIG. 7 is a bottom perspective view of the structure of the principal parts of movable part 20 shown in FIG. 6. FIG. 8 is a diagram for explaining an attachment structure of FPC 40, coil holder 22, and elastic supporting body 30.

Coil holder 22 shown in FIGS. 2 to 7 is a connecting part used to connect coil 21 to elastic supporting body 30. Coil holder 22 includes coil container 222 for containing coil 21, container fixer members 224, and board insertion member (insertion member) 226 (see FIGS. 3 to 5).

In this embodiment, coil holder 22 is composed of a resin material. Thus, electrical insulation between coil holder 22 and other metal members (for example, elastic supporting body 30) is ensured, thereby improving reliability. In addition, since coil holder 22 is attached to elastic supporting body 30 with coil 21 fixed, coil 21 is prevented from deforming and/or becoming loose and the workability and ease of attachment can be improved.

The resin material is preferably a liquid crystal polymer or polyphenylene sulfide resin (PPS resin), for example. With the use of a highly-fluid liquid crystal polymer or PPS as the resin material for coil holder 22, coil holder 22 can be made thinner while its strength is maintained, thereby saving space. This increases the flexibility in designing coil 21 and magnet 11 and increases the vibrational output of vibration actuator 1. In addition, since a liquid crystal polymer and PPS resin have excellent heat resistance and mechanical strength, the reliability also improves.

Coil container 222 in this embodiment is formed into a rectangular parallelepiped frame shape that is opened on both sides extending along the length direction (direction Y), and the outer peripheral surface and upper end surface of coil 21 are fixed to the inner surface of coil container 222. The upper surface of coil container 222 is formed into a frame with opening 222a (see FIG. 3) through which magnet 11 can be inserted.

Coil container 222 has end face sections (222b and 222c) extending vertically downward from the top surface on both sides separated along the length direction (direction Y). For convenience, end face section (222b) on the back of coil container 222 will be hereinafter referred to as base end face section 222b which is adjacent to the fixed end that is fixed to plate spring member 33, and end face section (222c) which is opposite from the back and adjacent to the free end will be hereinafter referred to as front end face section 222c.

Ribs protruding toward the back (in direction Y) from both sides separated along the width direction (direction X) are provided on the outer surface (the surface on the back) of base end face section 222b of coil container 222. Base end face section 222b and the ribs stabilize the mounting position of coil 21 and improve the mounting accuracy when coil 21 is mounted inside coil container 222, that is, on the inner side of base end face section 222b and the ribs. Consequently, regarding vibration actuator 1, the vibrational output can be stabilized between finished products. Moreover, positioning of coil 21 is easier, so that the workability improves. In addition, since nothing resides between coil 21 and magnet 11, coil 21 and magnet 11 can be brought close to each other, which is preferable in terms of increasing the vibrational output of vibration actuator 1.

Container fixer members 224 fix coil holder 22 to elastic supporting body 30.

Container fixer members 224 in this embodiment are provided on the top surface of coil container 222. Container fixer members 224 are protrusions provided on the top surface of the frame of coil container 222 and on sides opposed along the length direction (direction Y), and are positioned when inserted in insertion holes 322 in frame-like holder attaching member 32 of elastic supporting body 30 stacked on that top surface.

As shown in FIG. 3, FIG. 4, and FIGS. 6 to 8, connection board 42 of flexible printed circuit board 40 (hereinafter referred to as "FPC 40") to be electrically connected to coil 21 is inserted in board insertion member 226 and is thus fixed. Hence, both ends of coil 21 and connection board 42 of FPC 40 can be disposed in predetermined positions, for example, near base end face section 222b.

Board insertion member 226 is formed into a shape that protrudes outward (toward the back) from both sides of base end face section 222b of coil container 222. Connection board 42 is inserted to board insertion member 226 from above and engaged with it. In this embodiment, connection board 42 is overlaid on the outer surface of base end face section 222b and engages with base end face section 222b and board insertion member 226.

Wiring of connection board 42 of FPC 40 inserted in board insertion member 226 is connected to both ends of coil 21 drawn outward from the interior of coil container 222 through groove 223 formed in a bottom end portion of base end face section 222b, by soldering, for example. With this structure, both ends of coil 21 can be drawn outward from the interior of coil container 222 through groove 223 in base end face section 222b and connected to FPC 40 by soldering or the like, so that a connection between FPC 40 and coil 21 can be easily established from the outside of movable part 20. Since both ends of coil 21 are disposed in groove 223, both ends of coil 21 do not interfere with vibration of movable part 20.

Since coil holder 22 has board insertion member 226, fixation of FPC 40 to coil holder 22 can be made strong. Moreover, both ends of coil 21 can be easily joined to wiring of FPC 40 strongly held by board insertion member 226 by soldering or bonding, so that workability is enhanced and manufacture with stable reliability can be achieved.

Coil 21 is an air-core coil which is energized during operation, and constitutes a voice coil motor together with magnet 11. Coil 21 is formed, for example, by winding and fusing self-welding wires. Coil 21 is attached to holder attaching member 32 of elastic supporting body 30 through coil holder 22.

Coil 21 has a shape that contours to the inner peripheral surface of coil container 222, that is, a shape that contours to a region (here, in a substantially rectangular shape) defined by the top surface, base end face section 222b, front end face section 222c, and ribs. Hence, coil 21 can be easily attached to coil holder 22. To be specific, coil 21 can be easily fixed to the top surface of coil container 222 and end face sections (base end face section 222b and front end face section 222c), for example, by bonding at the top surface of coil 21 and both end surfaces of coil 21 separated along the length direction (the end surface adjacent to the base end and the end surface adjacent to the front end).

In assembled vibration actuator 1, magnet 11 is disposed radially inside coil 21 with a predetermined gap therebetween as described above. In this case, coil 21 is located around a joint portion between first magnet 111 and second magnet 112.

Both ends of coil 21 are connected to connection board 42 of FPC 40 by drawing groove 223 of base end face section 222b of coil container 222 to the exterior. Coil 21 is energized via this FPC 40.

Weight 23 is a weight for increasing the vibrational output of movable part 20. Weight 23 is preferably disposed adjacent to the free end of movable part 20. Weight 23 in this embodiment has an arrowhead-like shape and is tapered so that the top and bottom surfaces get closer toward the free end, that is, front end. Hence, the thickness of weight 23 in the vibration direction decreases toward the free end. Weight 23 is provided continuous from weight fixer member 31 of elastic supporting body 30 along a direction in which weight fixer member 31 extends, and is disposed adjacent to coil 21 with coil holder 22 therebetween.

An end portion of weight 23 on the back is an elastic fixer member 232 to which weight fixer member 31 of elastic supporting body 30 is fixed. Elastic fixer member 232 is thinner than a portion of weight 23 extending out from elastic supporting body 30, here, the tapered portion by a thickness of weight fixer member 31 of elastic supporting body 30 so that when it is coupled to elastic supporting body 30 through weight fixer member 31, their surfaces (here, the top surfaces) flush with each other.

In weight 23, front and rear surfaces (surfaces separated along the vibration direction, that is, direction Z, and corresponding to top and bottom surfaces here) adjacent to the free end and continuous to elastic fixer member 232 are tapered to converge toward the front end. These tapered faces are provided so that they become substantially parallel to the top and bottom surfaces of the housing when movable part 20 vibrates. Accordingly, weight 23 can vibrate within a wider space in the housing than in the case where a weight having the same thickness in direction Z as weight 23 and having, in a reference position, flat top and bottom surfaces parallel to the opposed top and bottom surfaces of the housing is used for vibrating movable part 20 within the same oscillation range. In addition, regarding weight 23 having tapered top and bottom surfaces, increasing the thickness between the top and bottom surfaces from the free end toward the back can yield a higher weight of movable part 20 compared with use of a weight having flat and parallel top and bottom surfaces. Accordingly, higher vibrational output can be obtained.

An end portion of weight 23 on the back is provided with elastic fixer member 232 on top and bottom surfaces and elastic fixer member 232 is formed into the same shape on the top and bottom surfaces. Hence, upon fixation of weight 23 to elastic supporting body 30, weight fixer member 31 and elastic fixer member 232 can be fixed to each other regardless of directions the top and bottom surfaces of weight 23 face. Weight fixer member 31 and elastic fixer member 232 are bonded and fixed to each other using an adhesive such as thermosetting adhesive, for example. Alternatively, weight fixer member 31 and elastic fixer member 232 may be fixed to each other by welding. It should be noted that weight fixer member 31 and elastic fixer member 232 may be joined to each other, for example, by being swaged together with a rivet of a copper-based material (copper or copper alloy) or stainless material.

It is preferable that weight 23 be composed of a material whose specific gravity (for example, specific gravity of about 16 to 19) is higher than a material of an electrogalvanized steel plate (SECC; the specific gravity of the steel plate is 7.85) or the like. Tungsten, for example, can be used as a material for weight 23. With such a material, even in the case where the dimensions of the external shape of movable part 20 are set at design time or the like, the mass of movable part 20 can be increased comparatively easily and a desired vibrational output can be achieved.

During oscillation, the front end portions of the tapered portions of the top and bottom surfaces of weight 23 (portions to come into collision with base plate 13 and cover 15) come into collision with damper materials 45.

This relieves the impact caused when vibrating movable part 20 comes into contact with base plate 13 or cover 15, thereby allowing vibrations to be transmitted to the user while reducing a contact sound or vibrational noise. Besides, since movable part 20 comes into contact (specifically, collision) alternately with base plate 13 and cover 15 through damper materials 45 each time it vibrates, the vibrational output is amplified. Hence, the user can sense a vibrational output greater than the actual vibrational output of movable part 20. Moreover, since base plate 13 is a member mounted on the user, vibrations of movable part 20 are directly transmitted to the user through base plate 13 and the user can sense a still greater vibrational output.

FPC 40 extends along plate spring member 33 of elastic supporting body 30 and is drawn to the exterior of cover 15 from the base end side of plate spring member 33.

FPC 40 includes connection board 42 connected to coil 21, and FPC body 41 that is disposed along plate spring member 33, is connected to connection board 42, and has one end extending to the exterior of cover 15.

FPC body 41 is connected to connection board 42 via joint board 43. Joint board 43 laterally extends from the other end portion of FPC body 41 so that it surrounds plate spring member 33, which is below FPC body 41, from below.

In particular, as shown in FIG. 8, joint board 43 is disposed so that it surrounds top and bottom surfaces of plate spring member 33 from one side and engages with plate spring member 33. Hence, joint board 43 serves as an engaging member to engage with plate spring member 33 so that making FPC body 41 barely separated from plate spring member 33 in direction Z. Further, a part of joint board 43 below plate spring member 33 is connected to connection board 42 in such a manner that connection board 42 is bendable.

Thus, in FPC 40, with FPC body 41 placed on plate spring member 33, joint board 43 can be engaged with spring member 33 and connection board 42 can be inserted in and held in board insertion member 226 below plate spring member 33. FPC 40 deforms following the vibrations of movable part 20.

It should be noted that in FPC 40, an elastic member, such as an elastic adhesive or elastic adhesive tape, for example, may be placed between FPC body 41 and plate spring member 33 so that the elastic member absorbs the impact during vibration.

[Elastic Supporting Body 30]

Elastic supporting body 30 includes weight fixer member 31 and holder attaching member 32 in addition to plate spring member (elastic supporting part) 33 that supports movable part 20 movably with respect to fixing part 10. Weight fixer member 31, holder attaching member 32, and plate spring member 33 are integrally formed, for example, by sheet-metal working of a stainless steel plate. Note that, during operation, plate spring member 33 deforms and weight fixer member 31 and holder attaching member 32 vibrate integrally with coil 21, weight 23, and the like. Weight fixer member 31 and holder attaching member 32 are parts of movable part 20 as described above. Note that weight fixer member 31, holder attaching member 32, and plate spring member 33 may be different members. Alternatively, two adjacent members may be integrally formed and the remaining member may be a different member.

Weight fixer member 31 and holder attaching member 32 have a plate-like shape as well as plate spring member 33, and holder attaching member 32 and weight fixer member 31 are continuously provided in the order presented from the other end of plate spring member 33.

Weight fixer member 31 is a member to which weight 23 is connected. Weight fixer member 31 is in surface-contact with elastic fixer member 232 and fixed on the upper surface of weight 23.

Holder attaching member 32 fixes coil holder 22, which contains coil 21, to elastic supporting body 30. Holder attaching member 32 is provided at the other end of main surface section 331 of plate spring member 33 and protrudes continuously from main surface section 331 in a direction in which main surface section 331 extends, thereby constituting a movable part fixer member. Holder attaching member 32 forms a frame with opening 321 (see FIG. 3) through which magnet 11 is inserted. Holder attaching member 32 has insertion holes 322, which extend in the width direction, on sides separated along the length direction. Container fixer members 224 are inserted in insertion holes 322. Thus, with coil holder 22 positioned on the bottom surface of holder attaching member 32, coil holder 22 is fixed, for example, by bonding.

Further, holder attaching member 32 is provided with reinforcing member 28 for increasing the rigidity of holder attaching member 32.

Reinforcing member 28 is a frame with opening 281 in the same shape as opening 321 of holder attaching member 32 and is fixed on the top surface of holder attaching member 32 for reinforcing the top surface of the frame of holder attaching member 32. Reinforcing member 28 in this embodiment is fixed on the top surface of holder attaching member 32 by welding. A configuration in which reinforcing member 28 is fixed on holder attaching member 32 by welding is not necessarily the case: it may be fixed by bonding, sticking, or the like, or integrally formed therewith.

Holder attaching member 32 is formed into a frame with opening 321 and therefore has low rigidity. Such low rigidity may cause fluctuations in resonance frequency or a decrease in reliability of the operation of vibration actuator 1. Holder attaching member 32 in this embodiment is a frame disposed in a narrow space around the magnet but has high rigidity produced by reinforcing member 28, thereby achieving high stability of the operation of vibration actuator 1.

Plate spring member 33 has a plate-like shape and deforms during operation. Plate spring member 33 corresponds to an elastic supporting part. One end of plate spring member 33 is fixed to fixing part 10 at the side of movable part 20, and the other end is fixed to movable part 20, thereby cantilevering movable part 20 in such a manner that it can reciprocate in the vibration direction.

Plate spring member 33 in this embodiment includes plate-like main surface section 331 extending from movable part 20 toward one side, here, the back side, and main surface fixer member 333 provided at one end of main surface section 331 and fixed to fixing part 10, for example, by wielding or bonding.

Plate spring member 33 has an L shape in which main surface fixer member 333 bends down perpendicularly from one end of main surface section 331.

The other end of main surface section 331 is connected to coil 21 through coil holder 22 attached to holder attaching member 32, and to weight 23 attached to weight fixer member 31.

Main surface fixer member 333 is a planar member fixed to side end wall 133 of fixing part 10 by welding or bonding. In this embodiment, main surface fixer member 333 is fixed in the state where it is in surface-contact with the outer surface of side end wall 133. Main surface fixer member 333 is fixed to side end wall 133, for example, by welding or bonding.

Since main surface fixer member 333 is fixed on the outer surface of side end wall 133 as described above, one end of elastic supporting body 30 joined to movable part 20, that is, main surface fixer member 333 can be easily fixed to fixing part 10 by welding or bonding from the exterior of vibration actuator 1.

In addition, side end wall 133 and main surface fixer member 333 stacked on the outer surface of side end wall 133 may be provided with a through hole for welding and they may be fixed together by piercing welding in such a manner that it is sandwiched with a component disposed on the outer surface of main surface fixer member 333. On the inner side of side end wall 133, a space is formed under plate spring member 33 and no impact of welding occurs. Further, the coefficient of elasticity of main surface section 331 can be adjusted by adjusting the area of welding of main surface fixer member 333 with respect to side end wall 133.

[Magnetic Circuit of Vibration Actuator 1]

Figure 9:
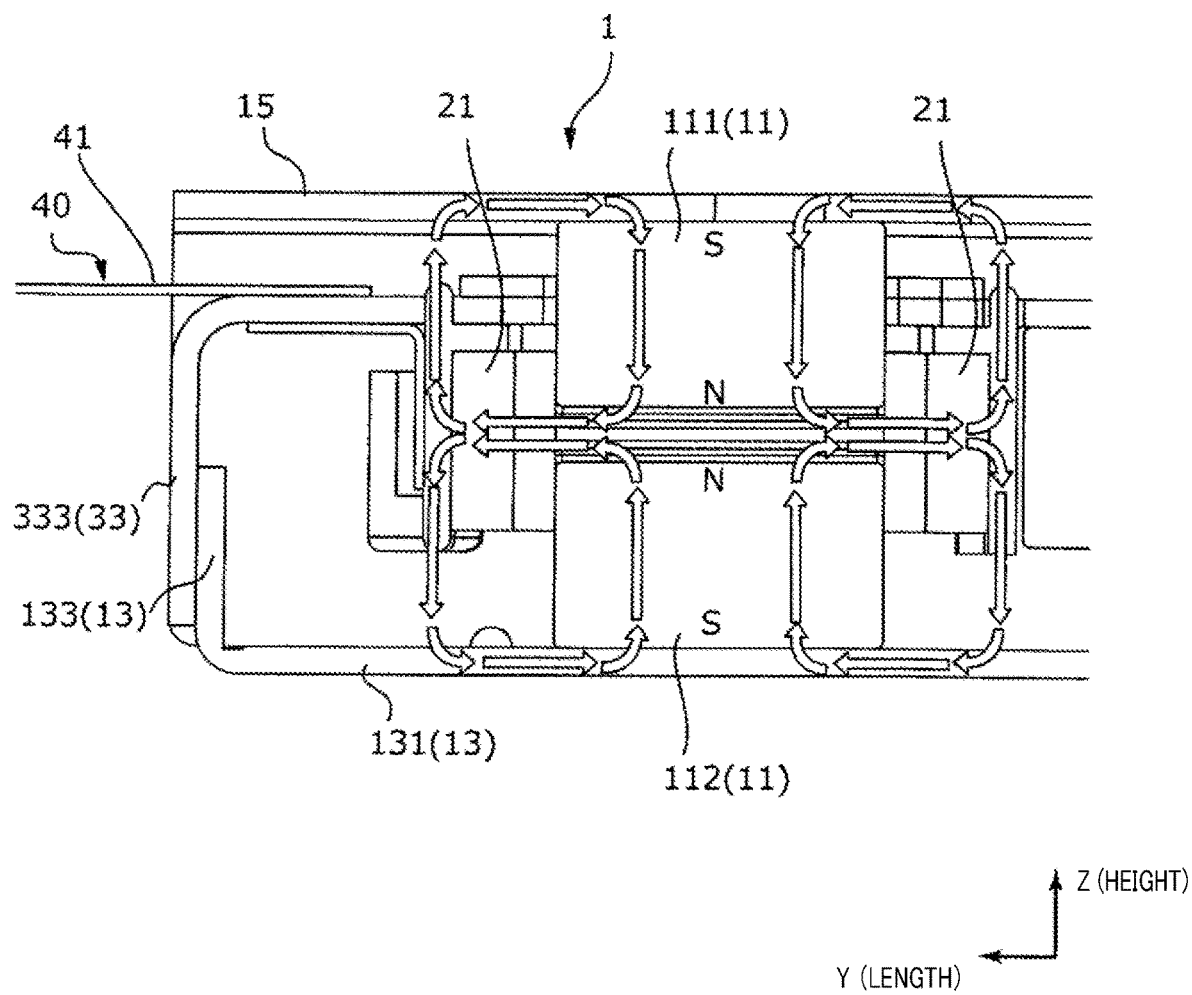
FIG. 9 is a diagram showing the magnetic circuit of the vibration actuator.

FIG. 9 is a diagram showing the magnetic circuit of vibration actuator 1. FIGS. 10A to 10C are longitudinal sectional views showing the operation of movable part 20. FIGS. 10A to 10C respectively illustrate a state of movable part 20 where movable part 20 is not energized (reference state), a state of movable part 20 where coil 21 is energized with a clockwise current as seen from above, and a state of movable part 20 where coil 21 is energized with a counterclockwise current as seen from above.

In vibration actuator 1, one end of movable part 20 is supported by plate spring member 33 of elastic supporting body 30 between base plate 13 and cover 15 of fixing part 10. In addition, magnet 11 is disposed radially inside coil 21 of movable part 20, and first magnet 111 and second magnet 112 are joined to each other so that their pole faces of the same polarity (the north pole in FIGS. 9 and 10A to 10C) face each other.

Movable part 20 reciprocates in direction Z (that is, in a direction along which movable part 20 moves toward and away from base plate 13 and cover 15) when coil 21 is energized by a power supplying part (not shown in the drawing) via FPC 40. In particular, the other end portion of movable part 20 oscillates. In this way, the vibrational output of vibration actuator 1 is transmitted to the user of the portable device provided with vibration actuator 1.

The magnetic circuit shown in FIG. 9 is formed in vibration actuator 1. In addition, in vibration actuator 1, coil 21 is provided perpendicular to the magnetic fluxes from first magnet 111 and second magnet 112. Accordingly, when energization is performed as shown in FIG. 10B, Lorentz force F is generated in coil 21 by interaction between the magnetic field of magnet 11 and the current flowing through coil 21 in accordance with the Fleming's left hand rule. The direction of Lorentz force F is a direction (positive direction Z in FIG. 10B) that is orthogonal to the direction of the magnetic field and to the direction of the current flowing through coil 21. With this Lorentz force F serving as a thrust, movable part 20 oscillates. To be specific, since one end of movable part 20 is supported by elastic supporting body 30 (plate spring member 33), the other end (that is, weight 23) of movable part 20 moves in positive direction Z as a result of oscillation. Afterwards, the front end of weight 23 in movable part 20 comes into contact (specifically, collision) with cover 15 via damper material 45.

Moreover, when the energizing direction in coil 21 is reversed and energization is performed as shown in FIG. 10C, inverse Lorentz force −F (in negative direction Z) is generated. With this Lorentz force −F serving as a thrust, movable part 20 oscillates. To be specific, the other end (that is, weight 23) of movable part 20 moves in negative direction Z as a result of oscillation, and the front end of weight 23 comes into collision with damper material 45 and comes into contact (specifically, collision) with base plate 13 itself via damper material 45.

In vibration actuator 1, movable part 20 is movably supported by a structure in which one end of plate spring member 33 is fixed to movable part 20 and the other end is fixed to fixing part 10.

To be specific, one end of plate spring member 33 is fixed on a side surface (side end wall 133) of fixing part 10 at the side of movable part 20; thus, deterioration of the planarity of plate body 131 can be avoided, for example, by leaving welding marks or the like by machining plate body 131 of base plate 13 constituting the bottom face of the housing of fixing part 10. Moreover, in vibration actuator 1, welding from the bottom face of the housing is unnecessary, so that upon attachment of plate spring member 33 to fixing part 10, plate spring member 33 joined to movable part 20 and fixing part 10 can be joined together by welding or the like at the side of vibration actuator 1 without turning the housing of vibration actuator 1 to expose the bottom face; thus, high productivity can be obtained.

Further, in this embodiment, plate spring member 33, that is, elastic supporting body 30 is formed by bending a metal plate into an L shape which ensures elasticity, eliminating the need for machining, such as complex bending, performed as spring machining for ensuring elasticity. In this way, the part accuracy of elastic supporting body 30 including plate spring member 33 is enhanced, stabilizing the performance.

In addition, the space occupied by plate spring member 33 in the housing is saved as much as possible so that movable part 20, and coil 21 and magnet 11 serving as a vertical vibration generator can be made big and vibration actuator 1 can be made compact, while yielding high output.

In addition, in vibration actuator 1, coil 21 and magnet 11 are disposed adjacent to the base end of movable part 20 (to which plate spring member 33 is joined), and weight 23 is disposed adjacent to the front end of movable part 20. In other words, the magnetic circuit for generating a driving torque of movable part 20 is disposed adjacent to the fulcrum for oscillation, and weight 23 is disposed adjacent to the front end of movable part 20 at which displacement occurs in the widest range during oscillation. Hence, compared with a configuration in which coil 21 and magnet 11 are disposed adjacent to the front end of movable part 20, weight 23 disposed adjacent to the front end can occupy a wide area and movable part 20 can be given a great rotational moment (mass in a rotating system), so that a high vibrational output can be achieved. This provides adaptability to a limitation on the height in direction Z and a limitation on the range of motion (amount of vibration) of movable part 20 due to a reduction in the height of vibration actuator 1.

Further, since weight 23 has an arrowhead-like shape in which the thickness in direction Z decreases toward the free end, compared with use of a weight in a rectangular parallelepiped shape in which the top and bottom surfaces are parallel to each other, a high range of motion is achieved during oscillation, thereby ensuring higher vibrational output.

Moreover, unlike in a vibration actuator in which a movable part vibrates while sliding on a fixing part, movable part 20 vibrates without sliding on a part of fixing part 10, so that attenuation in thrust due to frictional resistance to fixing part 10 does not occur during vibration, leading to preferable vibration.

In this way, a simple supporting structure is provided, which simplifies the design and saves space; thus, vibration actuator 1 can be made compact.

Here, vibration actuator 1 is driven by AC waves input to coil 21 from the power supplying part (not shown) via FPC 40. In other words, the energizing direction of coil 21 periodically switches and thrust F in positive direction Z and thrust −F in negative direction Z alternately act on movable part 20. Thus, the other end of movable part 20 vibrates along an arc over the YZ plane.

A brief description will now be given of the driving principle of vibration actuator 1. In vibration actuator 1 of this embodiment, movable part 20 vibrates with respect to fixing part 10 at resonance frequency $f_r$ [Hz] calculated by equation 1 below where J [kg·m²] is the moment of inertia of movable part 20 and $K_{sp}$ is the spring constant of plate spring member 33 in the torsional direction.

[Expression 1]

$$f_r = \frac{1}{2\pi}\sqrt{\frac{K_{sp}}{J}} \quad (1)$$

$f_r$: Resonance frequency [Hz]
J: Moment of inertia [kg·m$^2$]
$K_{sp}$: Spring constant [N·m/rad]

Since movable part 20 is a mass in a vibration model of a spring-mass system, movable part 20 is brought into a resonance state when AC waves of a frequency equal to resonance frequency $f_r$ of movable part 20 are input to coil 21. In other words, movable part 20 can be efficiently vibrated by inputting AC waves of a frequency substantially equal to resonance frequency $f_r$ of movable part 20 to coil 21 from the power supplying part.

The motion equation and circuit equation representing the driving principle of vibration actuator 1 are shown below. Vibration actuator 1 is driven based on the motion equation represented by equation 2 below and the circuit equation represented by equation 3 below.

[Expression 2]

$$J\frac{d^2\theta(t)}{dt^2} = K_t i(t) - K_{sp}\theta(t) - D\frac{d\theta(t)}{dt} \quad (2)$$

J: Moment of inertia [kg·m$^2$]
θ(t): Angle [rad]
$K_t$: Torque constant [N·m/A]
i(t): Current [A]
$K_{sp}$: Spring constant [N·m/rad]
D: Damping coefficient [N·m/(rad/s)]

[Expression 3]

$$e(t) = R_s i(t) + L\frac{di(t)}{dt} + K_e\frac{d\theta(t)}{dt} \quad (3)$$

e(t): Voltage [V]
R: Resistance [Ω]
L: Inductance [H]
$K_e$: Counter electromotive force constant [V/(rad/s)]

In other words, moment of inertia J [kg·m$^2$], angle of rotation θ(t) [rad], torque constant $K_t$ [N·m/A], current i(t) [A], spring constant $K_{sp}$ [N·m/rad], damping coefficient D [N·m/(rad/s)], and the like of movable part 20 in vibration actuator 1 may be changed appropriately as long as equation 2 is satisfied. Voltage e(t) [V], resistance R [Ω], inductance L [H], and counter electromotive force constant $K_e$ [V/(rad/s)] may also be changed appropriately as long as equation 3 is satisfied.

As described above, in vibration actuator 1, high vibrational output can be efficiently obtained when coil 21 is energized using AC waves corresponding to resonance frequency $f_r$ determined by moment of inertia J of movable part 20 and spring constant $K_{sp}$ of plate spring member 33.

Embodiment 2

Figure 11:
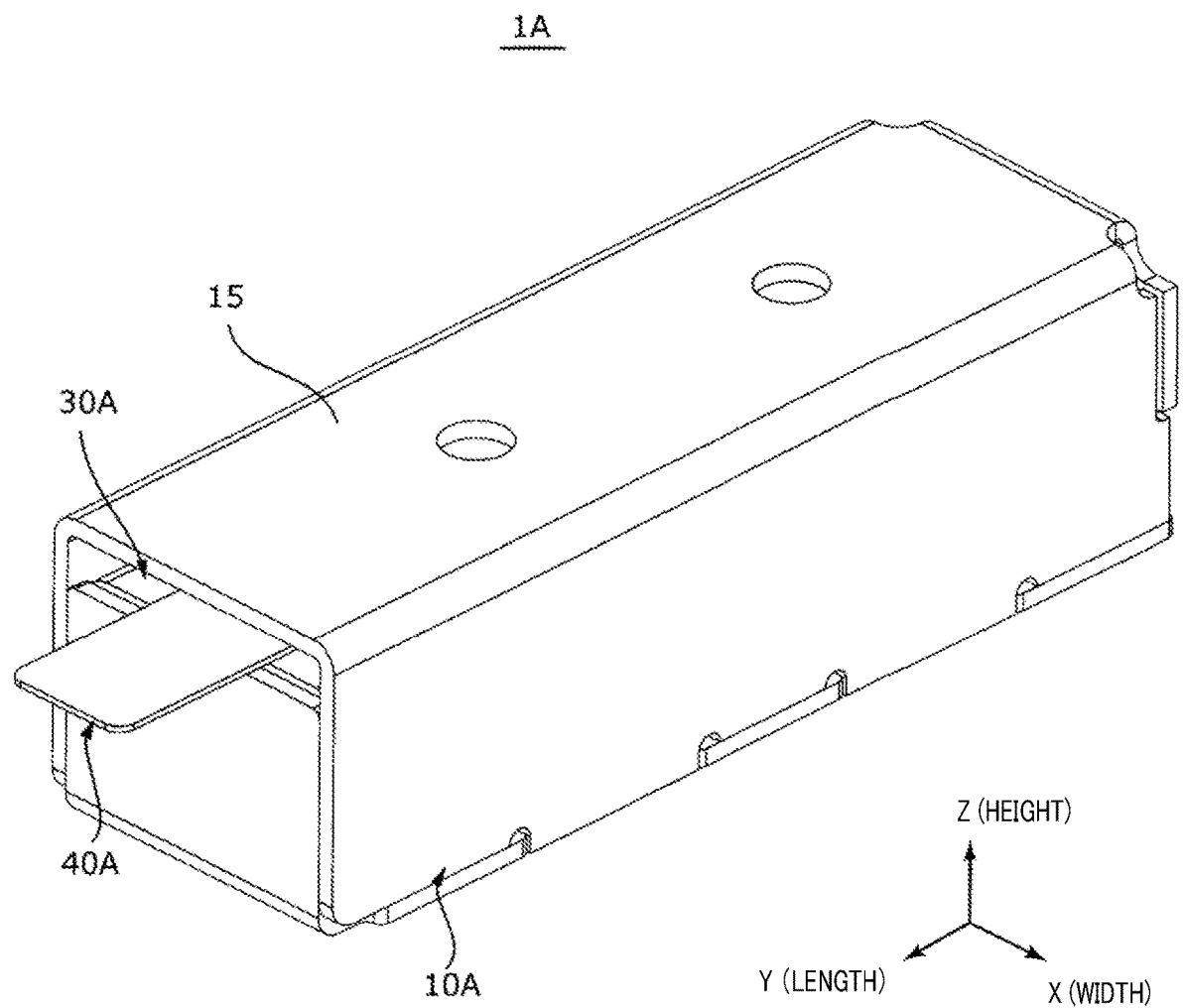
FIG. 11 is a perspective view of an external appearance of the vibration actuator according to Embodiment 2 of the present invention.
Figure 12:
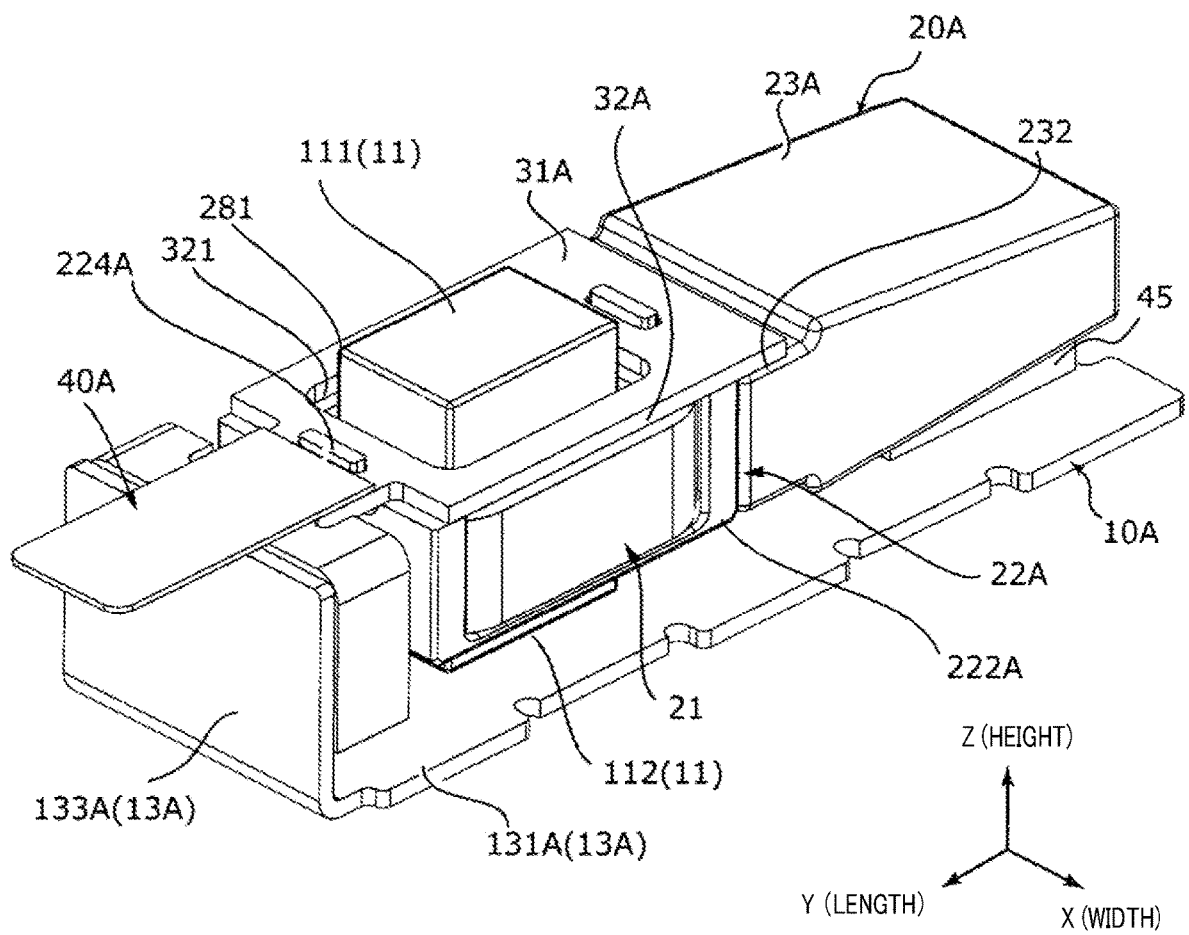
FIG. 12 is a perspective view showing a state in which the cover of the vibration actuator according to Embodiment 2 of the present invention is removed.
Figure 13:
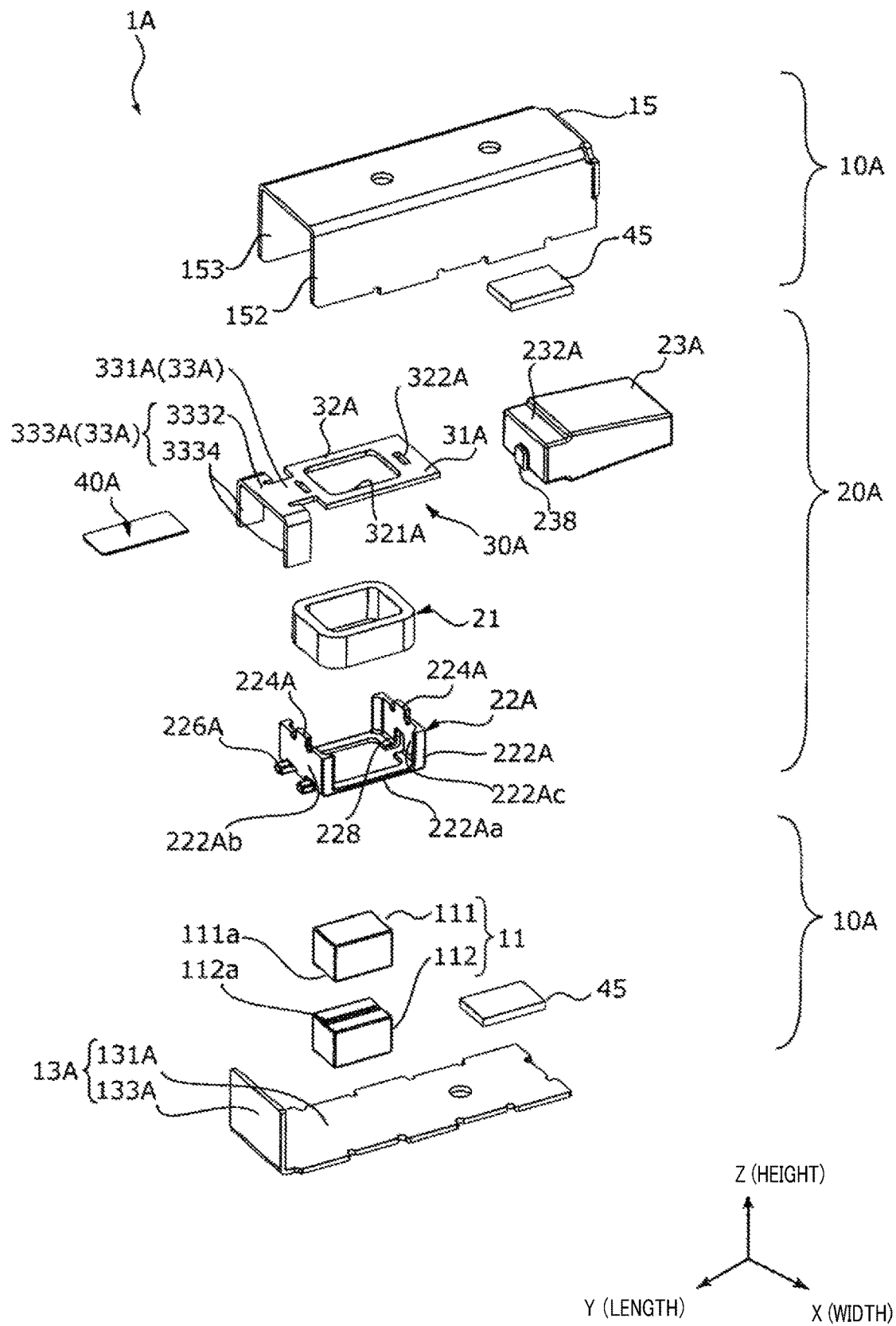
FIG. 13 is an exploded perspective view of the vibration actuator according to Embodiment 2 of the present invention.
Figure 14:
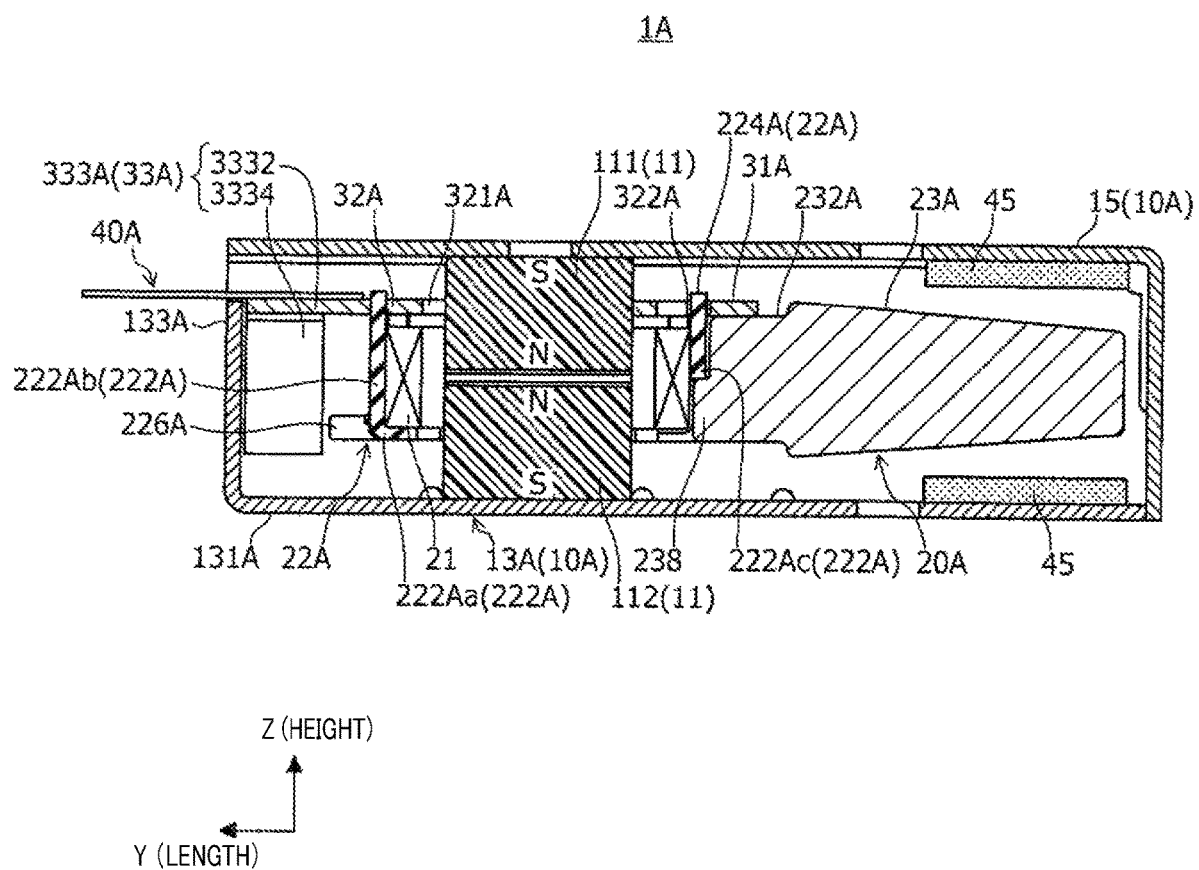
FIG. 14 is a longitudinal sectional view showing the structure of principal parts of the vibration actuator according to Embodiment 2 of the present invention.
Figure 15:
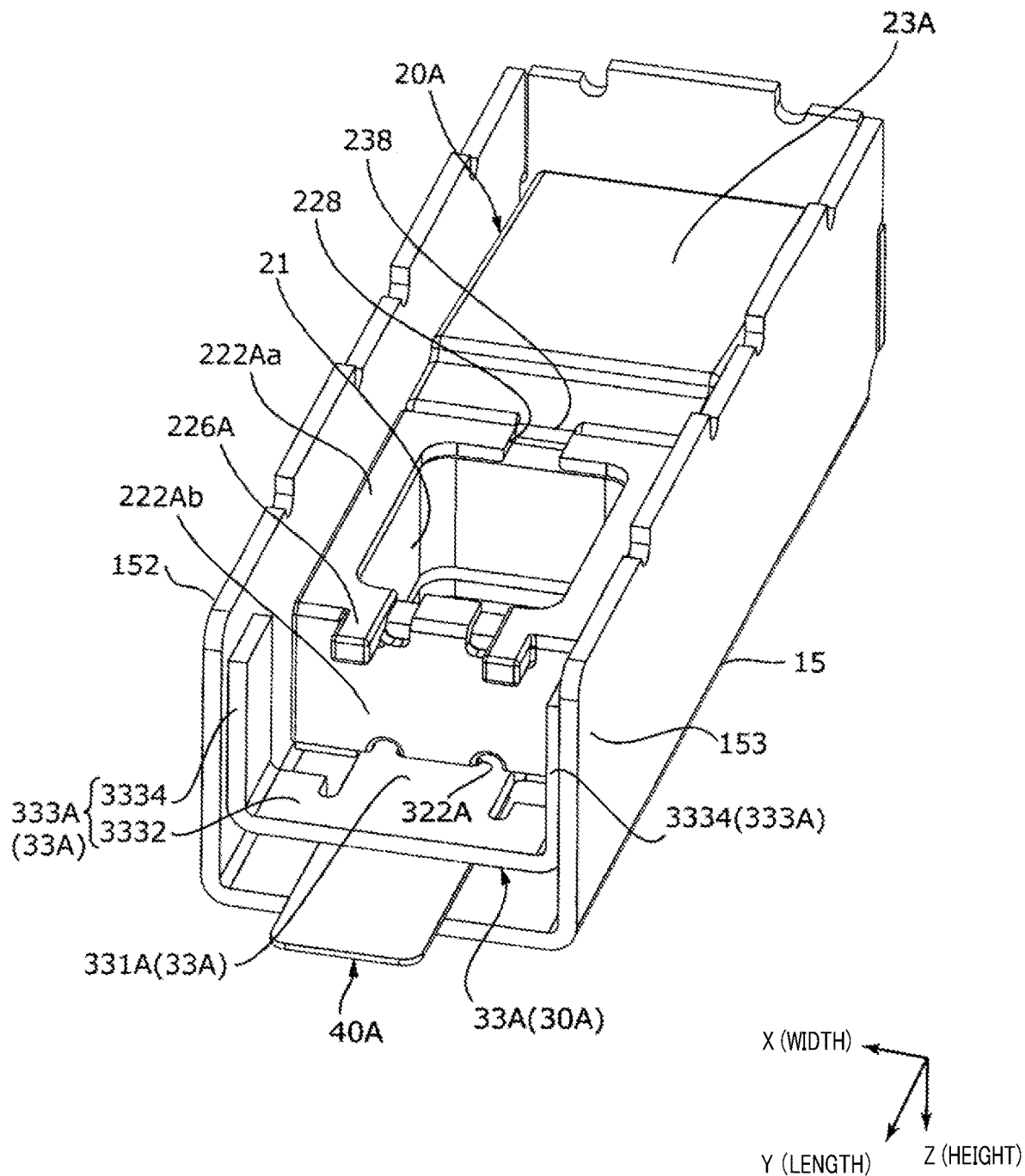
FIG. 15 is a bottom view of the vibration actuator from which the base plate is removed.

FIG. 11 is a perspective view of an external appearance of a vibration actuator according to Embodiment 2 of the present invention. FIG. 12 is a perspective view showing a state in which the cover of the vibration actuator according to Embodiment 2 of the present invention is removed. FIG. 13 is an exploded perspective view of the vibration actuator according to Embodiment 2 of the present invention. FIG. 14 is a longitudinal sectional view showing the structure of principal parts of the vibration actuator according to Embodiment 2 of the present invention. FIG. 15 is a bottom view of the vibration actuator from which a base plate is removed.

Actuator 1A of Embodiment 2 differs from actuator 1 of Embodiment 1 in that one end of its elastic supporting body 30 corresponds to back end portions 152 and 153 of side walls (here, side walls of cover 15) separated along the width direction of the housing, instead of side end wall 133. The basic structure of actuator 1A is similar to that of actuator 1. Therefore, a structural part different from that of actuator 1 will be described and a component providing the same effects as the corresponding component in actuator 1 is denoted by the same name and reference numeral as that component and its description will be omitted.

Like vibration actuator 1, vibration actuator 1A is mounted in a portable device, such as a smartphone (see FIGS. 16A and 16B), as a vibration source and implements the vibrating function of the portable device.

Vibration actuator 1A shown in FIGS. 11 to 15 includes fixing part 10A, movable part 20A, and elastic supporting body 30A. Fixing part 10A is coupled to movable part 20A through elastic supporting body 30A so that the other end reciprocates with one end as a fulcrum, and supports movable part 20A. In vibration actuator 1A, with the same magnetic circuit configuration as vibration actuator 1, when current is supplied to coil 21, movable part 20A vibrates in a vibration area in direction Z like vibration actuator 1.

[Fixing Part 10A]

Fixing part 10A is different from fixing part 10 in Embodiment 1 in that it includes base plate 13A instead of base plate 13. Fixing part 10A supports movable part 20A through elastic supporting body 30A, and includes magnet 11, base plate 13A, and cover 15.

Base plate 13A constitutes a housing together with cover 15. Base plate 13A includes rectangular plate body 131A constituting the bottom face of vibration actuator 1, and side end wall 133A standing up from a side of movable part 20 of plate body 131A, here, the back side.

Side end wall 133A covers the back end surface of the housing of vibration actuator 1A. Like in the case of plate body 131, magnet 11 and damper material 45 are fixed to plate body 131A of base plate 13A.

Cover 15 is provided so that it covers base plate 13A, and constitutes the top section of the housing of vibration actuator 1A, both side sections separated along the width direction, and a front end side section which is a side section on the front end side.

On the front end of the top section of cover 15, damper material 45 is provided in a position opposed to damper material 45 of plate body 131A.

One end of elastic supporting body 30A is fixed to the inner sides of back end portions 152 and 153 of the both side walls of cover 15. Like in Embodiment 1, base plate 13A and cover 15 are preferably composed of a conductive material.

[Movable Part 20A]

Movable part 20A has a function similar to that of movable part 20. Movable part 20A is disposed inside the housing intermediately between base plate 13A and the top section of cover 15 in such a manner that it is cantilevered substantially parallel to base plate 13 and the top section of cover 15. With elastic supporting body 30A, the free end of movable part 20A vibrates with respect to fixing part 10A in a direction orthogonal to the vibration transmitting surface (for example, plate body 131A of base plate 13A or top section of cover 15), here, in the vertical direction corresponding to direction Z.

Movable part 20A of this Embodiment 2 includes coil 21, coil holder 22A, and weight 23A which have functions similar to those of the respective components of movable part 20 having the same names. In this embodiment, weight fixer member 31A and holder attaching member 32A of elastic supporting body 30A also constitute a part of movable part 20 and oscillate as movable part 20. Movable part 20A faces base plate 13A and the top section of cover 15 in a non-energized state. Like in Embodiment 1, when coil 21 is energized, movable part 20A reciprocates in the height direction (direction Z) to move toward and away from base plate 13A and the top section of cover 15.

Coil holder 22A of this embodiment is held in such a manner that it surrounds and contains coil 21 with holder attaching member 32A of elastic supporting body 30A. Coil holder 22A is connected to elastic supporting body 30A so that coil 21 is attached to elastic supporting body 30A. Coil holder 22A includes coil container 222A for containing coil 21, container fixer member 224A on the top surface of coil container 222A, and tying parts 226A (see FIGS. 13 to 14).

In this embodiment, coil holder 22A is composed of the same resin material and has the same function as coil holder 22.

Coil container 222A in this embodiment includes a rectangular frame-like bottom face having an opening through which magnet 11 is passed to bottom face 222Aa, and end face sections (base end face section 222Ab and front end face section 222Ac) standing up from both sides separated along length direction (direction Y) of bottom face 222Aa. Like in Embodiment 1, base end face section 222Ab, which is an end face section adjacent to the fixed end, and front end face section 222Ac, which is an end face section adjacent to the free end each have ribs, which protrude toward the opposed end face section, along sides separated along the width direction (direction X). Coil 21 is disposed and fixed on the inner side of bottom face 222Aa, base end face section 222Ab, and front end face section 222Ac. Thus, coil 21 can be mounted in a stable position, providing the same effects as those provided by coil container 222. In addition, in coil container 222A, coil 21 can be contained with nothing between coil 21 and magnet 11.

Container fixer members 224A protrudes from the top surfaces of base end face section 222Ab and front end face section 222Ac. Container fixer members 224A are provided on the top surfaces of base end face section 222Ab and front end face section 222Ac and extend along the length direction, and are positioned when inserted in insertion holes 322A in frame-like holder attaching member 32A of elastic supporting body 30 attached on the top surface.

Tying parts 226A are connecting parts for electrically connecting coil 21 to FPC 40A and protrude outward from coil container 222A (specifically base end face section 222Ab). Tying parts 226A are connected to both ends of coil 21 and to the wiring of FPC 40A, for example, by soldering. Since coil holder 22 includes tying parts 226A, coil 21 can be always soldered to the same position on FPC 40A outside coil 21, so that high workability and stable manufacture can be achieved. In addition, since the ends of coil 21 are fixed to tying parts 226A, coil 21 can be prevented from becoming loose. Tying parts 226A in this embodiment, which are located directly below the front end of FPC 40A, can be connected to the wiring of FPC 40A when tied both ends of coil 21 are extended to directly above them. Coil 21 is energized through this FPC 40A.

Front end face section 222Ac of coil holder 22A has weight receiving section 228 that receives weight engagement section 238 of weight 23A. Weight receiving section 228 in this embodiment is a notch opened downward. When weight engagement section 238 is engaged with weight receiving section 228, weight 23A is positioned adjacent to coil holder 22A. Coil holder 22A and weight 23A are fixed together by bonding or welding weight engagement section 238 and weight receiving section 228 together.

Weight 23A has the same structure as weight 23 except that it has weight engagement section 238 on the end surface adjacent to the base end. In weight 23A, elastic fixer member 232A is provided on the back end and front and rear surfaces adjacent to the free end and continuous from elastic fixer member 232A are tapered into arrowhead shapes.

Weight fixer member 31A of elastic supporting body 30A is fixed to elastic fixer member 232A.

Weight engagement section 238 protrudes to the back from a flat end surface adjacent to the base end and fits the shape of weight receiving section 228.

FPC 40A extends along plate spring member 33A of elastic supporting body 30A and is drawn to the exterior of cover 15 from the base end side of plate spring member 33A.

[Elastic Supporting Body 30A]

The structure of elastic supporting body 30A is different from that of elastic supporting body 30 in that one end attached to fixing part 10A corresponds to back end portions 152 and 153 of both side walls of cover 15.

To be specific, elastic supporting body 30A includes plate spring member (elastic supporting part) 33A for supporting movable part 20A movably with respect to fixing part 10A, weight fixer member 31A, and holder attaching member 32A. Weight fixer member 31A, holder attaching member 32A, and plate spring member 33A are integrally formed, for example, by sheet-metal working of a stainless steel plate, in the order presented to the back from the front end. Note that, during operation, plate spring member 33A deforms and weight fixer member 31A and holder attaching member 32A vibrate integrally with coil 21, weight 23A, and the like. As described above, weight fixer member 31A and holder attaching member 32A constitute a part of movable part 20A. In addition, regarding weight fixer member 31A, holder attaching member 32A, and plate spring member 33A, one of them may be a different member. Alternatively, two adjacent members may be integrally formed and the remaining member may be a different member.

Weight fixer member 31A is fixed by being in surface-contact with elastic fixer member 232A on the upper surface of weight 23A and elastic supporting body 30A is connected to weight 23A. Holder attaching member 32A forms a frame with an opening 321A (see FIG. 13) through which magnet 11 is inserted and fixes coil holder 22A containing coil 21 to elastic supporting body 30A. Container fixer members 224A are inserted in insertion holes 322A of holder attaching member 32A; thus, with coil holder 22A positioned on the bottom surface of holder attaching member 32A, coil holder 22A is fixed, for example, by bonding.

Plate spring member 33A has a plate-like shape and deforms during operation. Plate spring member 33A corresponds to an elastic supporting part. One end of plate spring member 33A is fixed to back end portions 152 and 153 of cover 15 of fixing part 10A on sides of movable part 20A (here, both sides opposed along the width direction), and the other end is fixed to movable part 20A, thereby cantilevering movable part 20A in such a manner that it can reciprocate in the vibration direction.

Plate spring member 33A in this embodiment is fixed to back end portions 152 and 153 through main surface fixer member 333A provided at one end of plate-like main surface section 331A, which extends from movable part 20A toward one side, here, the back side, for example, by wielding or bonding.

Main surface fixer member 333A is continuous to main surface section 331A in a planar manner, and includes fixer member top section 3332 extending in the width direction, and fixer legs 3334 extending vertically downward from ends of fixer member top section 3332 opposed along the width direction, thereby forming a U shape that opens downward when viewed along the length direction (direction Y).

A portion where main surface section 331A extends from fixer member top section 3332 has slits. With slits in fixer member top section 3332, the length of fixer member top section 3332 in a direction in which main surface section 331A extends, here, direction Y can be made long, thereby allowing main surface section 331A to be more easily deformed with elasticity.

Main surface fixer member 333A is fixed to the inner sides of back end portions 152 and 153 of cover 15 through fixer legs 3334 by welding or bonding.

Hence, one end of elastic supporting body 30A is fixed to fixing part 10A and the cantilever structure allows movable part 20A to be supported in such a manner that it can oscillate, without interfering with the movable range of movable part 20A, providing the same advantageous effects as those provided by Embodiment 1.

Embodiment 3

Figure 16A:
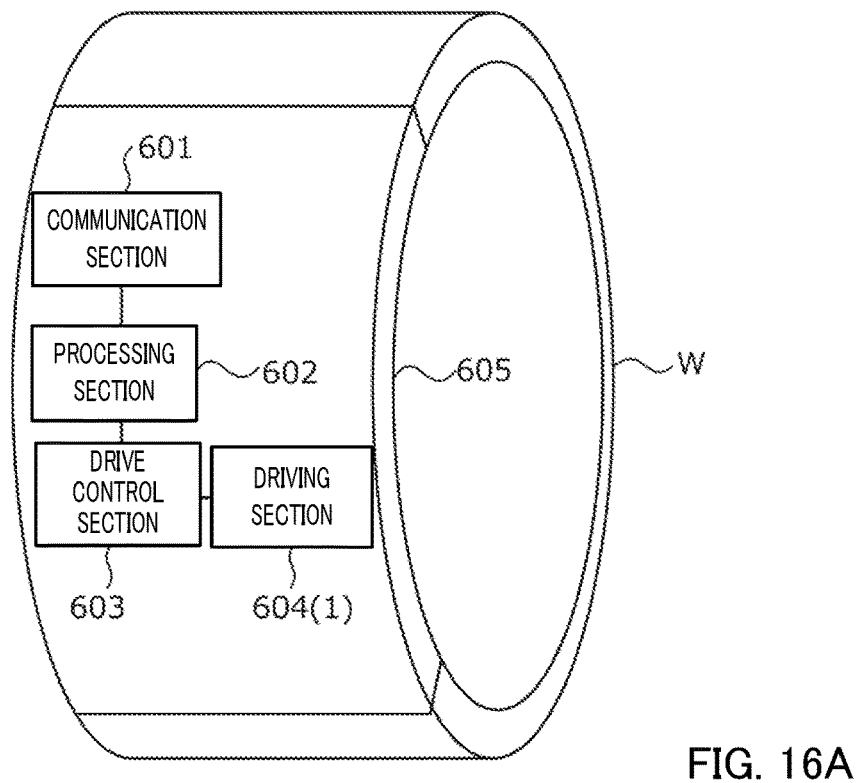
FIG. 16A is a diagram showing an example of portable device including the vibration actuator.
Figure 16B:
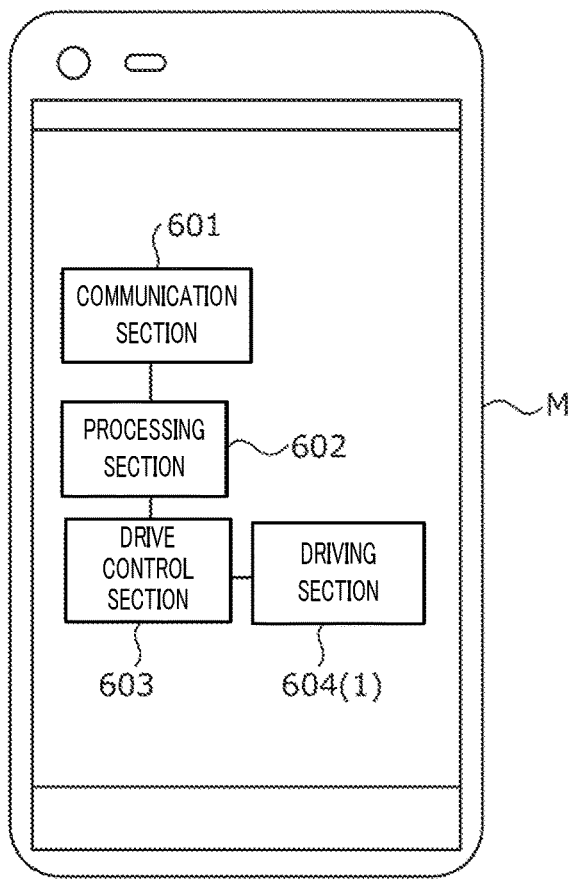
FIG. 16B is a diagram showing an example of portable device including the vibration actuator.

FIGS. 16A and 16B show Embodiment 3 which is an example of exemplary mounting configurations of vibration actuator 1. FIG. 16A shows an example of vibration actuator 1 mounted in wearable terminal W, and FIG. 16B shows another example of vibration actuator 1 mounted in mobile terminal M.

Wearable terminal W is worn for use by a user. Wearable terminal W here has a ring shape and is attached to a finger of the user. Wearable terminal W is wirelessly connected to an information communication terminal (for example, mobile phone). Wearable terminal W notifies the user of an incoming call and/or incoming mail on the information communication terminal through vibration. Note that wearable terminal W may be provided with functions other than incoming call notification (for example, a function of input to the information communication terminal).

Mobile terminal M is a portable communication terminal, such as a mobile phone or smartphone, for example. Mobile terminal M vibrates to notify the user of an incoming call from an external communication device and implement functions of mobile terminal M (for example, functions of giving operational feeling or realism).

As shown in FIGS. 16A and 16B, wearable terminal W and mobile terminal M each include communication section 601, processing section 602, drive control section 603, and driving section 604. Vibration actuator 1 is used as driving section 604.

In wearable terminal W and mobile terminal M, vibration actuator 1 is mounted in such a manner that the XY face of vibration actuator 1 is parallel to the main surface of the terminal serving as a vibration transmitting surface. To be specific, in the case of wearable terminal W, vibration actuator 1 is mounted in such a manner that inner peripheral surface 605 of the annular housing serves as a main surface (a vibration transmitting surface) and the XY face is substantially parallel (including parallel) to inner peripheral surface 605. In the case of mobile terminal M, vibration actuator 1 is mounted in such a manner that the XY face is parallel to the display screen (touch panel face) serving as a main surface to be in contact with the user. Hence, vibration perpendicular to inner peripheral surface 605 of wearable terminal W and the main surface of mobile terminal M which serve as vibration transmitting surfaces is transmitted to the user.

Communication section 601 is wirelessly connected to an external communication device, receives signals from the communication device, and outputs signals to processing section 602. In the case of wearable terminal W, the external communication device is an information communication terminal, such as a mobile phone, smartphone, or portable game terminal, for example, and communication is performed according to a short-distance radio communication standard, such as Bluetooth (registered trademark). In the case of mobile terminal M, the external communication device is, for example, a base station, and communication is performed according to mobile telecommunications standards.

Processing section 602 converts input signals into driving signals for driving driving section 604 (vibration actuator 1) through a conversion circuit section (not shown in the drawing), and outputs the driving signals to drive control section 603. Note that, in mobile terminal M, processing section 602 generates driving signals based on signals input from communication section 601 and signals input from various function sections (which is not shown in the drawing and is, for example, an operation section such as a touch panel).

Drive control section 603 is connected to driving section 604 (FPC 40 of vibration actuator 1) and is mounted with a circuit for driving driving section 604. Drive control section 603 supplies driving signals to driving section 604.

Driving section 604 is driven based on driving signals from drive control section 603. To be specific, in vibration actuator 1 used as driving section 604, movable part 20 vibrates perpendicularly to the main surfaces of wearable terminal W or mobile terminal M. Since movable part 20 comes into contact with base plate 13 or cover 15 every time it vibrates, the impact on base plate 13 or cover 15 caused by the vibration of movable part 20 is transmitted directly to the user as vibration. Since the vibration perpendicular to a body surface of the user is transmitted to the body surface in contact with wearable terminal W or mobile terminal M, sufficient physically-felt vibrations can be given to the user.

As described above, vibration actuator 1 according to this embodiment includes: movable part 20 including coil 21; fixing part 10 including magnet 11; and plate spring member 33 (elastic supporting part) configured to support movable part 20 movably with respect to fixing part 10. Movable part 20 is configured to reciprocate with respect to fixing part 10 in a vibration direction through cooperation between coil 21 and magnet 11. Magnet 11 is disposed away from and radially inside coil 21. One end of plate spring member 33 is fixed to fixing part 10 and the other end is fixed to movable part 20, constituting a structure in which movable part 20 is cantilevered. Coil 21 is incorporated in movable part 20 in the state where it is fixed to coil holder 22 composed of a resin.

According to vibration actuator 1, sufficient physically-felt vibrations can be given to a user without increasing the size. In addition, since coil holder 22 is composed of a resin material, electrical insulation between coil holder 22 and other metal members (for example, elastic supporting body 30) can be ensured, thereby improving reliability. In addition, since coil holder 22 is attached to elastic supporting body 30 with coil 21 fixed to coil holder 22, coil 21 is prevented from deforming and/or becoming loose and the workability and ease of attachment can be improved.

The invention made by the present inventor has been specifically described based on the embodiments. The present invention should not be limited to the above-mentioned embodiments and modifications can be made without departing from the scope of the present invention.

In addition, for example, it is also preferable that vibration actuators 1 and 1A according to the present invention be applied to portable devices other than wearable terminal W and mobile terminal M described in the embodiment (for example, portable information terminals, such as tablet PCs, portable game terminals, and controllers (game pads) of stationary game machines).

It should be understood that the embodiments disclosed herein are to be taken as illustrative only and do not limit the scope of the invention. The scope of the present invention should not be defined by the above-mentioned description but by the claims. Equivalents and all modifications of the claims should be included in the scope of the present invention.

REFERENCE SIGNS LIST 1, 1A Actuator
10, 10A Fixing part
11 Magnet
111 First magnet
112 Second magnet
13, 13A Base plate
15 Cover
20, 20A Movable part
21 Coil
22, 22A Coil holder
226 Board insertion member
23, 23A Weight
28 Reinforcing member
30, 30A Elastic supporting body
31, 31A Weight fixer member
32, 32A Holder attaching member (movable part fixer member)
33, 33A Plate spring member (elastic supporting part)
40, 40A FPC (flexible board)
41 FPC body
42 Connection board
43 Joint board
45 Damper material
111a, 112a Depressed portion
131, 131A Plate body
133, 133A Side end wall
152, 153 Back end portion
222, 222A Coil container
222a, 281, 321, 321A Opening
222b, 222Ab Base end face section
222c, 222Ac Front end face section
222Aa Bottom face
223 Groove
224, 224A Container fixer member
226 Board insertion member
226A Tying part
228 Weight receiving section
232, 232A Elastic fixer member
238 Weight engagement section
322, 322A Insertion hole
331, 331A Main surface section
333, 333A Main surface fixer member
3332 Fixer member top section
3334 Fixer legs
601 Communication section
602 Processing section
603 Control section
604 Driving section
605 Inner peripheral surface

The invention claimed is:

1. A vibration actuator, comprising:
a fixing part including one of a coil and a magnet;
a movable part including the other one of the coil and the magnet; and
an elastic supporting part configured to support the movable part movably with respect to the fixing part, wherein
the movable part is configured to reciprocate with respect to the fixing part in a vibration direction through cooperation between the coil supplied with electric power and the magnet,
the magnet is disposed away from and radially inside the coil, and
the elastic supporting part has a plate-like shape in which one end of the elastic supporting part is fixed to the fixing part at a side of the movable part and the other end is fixed to the movable part, and cantilevers the movable part in such a manner that the movable part can reciprocate in the vibration direction,
wherein the elastic supporting part is an L-shaped plate spring including a plate-like main surface section that intersects the vibration direction and is disposed between a fixed-end of the movable part at which the other end of the elastic supporting part is fixed and an end face section of the fixing part opposed to the base end surface, and
a main surface fixer member that is bent, provided at one end of the main surface section, and fixed at the end face section of the fixing part.

2. The vibration actuator according to claim 1, wherein the fixing part includes a rectangular case that movably contains the movable part, and
a damper is provided in a top section and a basal section of the case and is configured to come into contact with a free end side of the movable part upon reciprocation of the movable part to transmit vibrations to the top section and the basal section while relieving an impact caused by the contact.

3. The vibration actuator according to claim 1, wherein the main surface fixer member of the elastic supporting part is fixed in a position outer than the end face section of the fixing part.

4. The vibration actuator according to claim 1, wherein at the other end of the main surface section of the elastic supporting part, a movable part fixer member protruding in a direction in which the main surface section extends and serving as a part of the movable part is continuously provided, and
the movable part fixer member has a reinforcing member.

5. The vibration actuator according to claim 1, wherein the coil is incorporated in the movable part or the fixing part in a state where the coil is fixed to a coil holder, and the coil holder includes an insertion member in which a board for feeding power to the coil is inserted and fixed.

6. The vibration actuator according to claim 1, wherein the movable part includes a weight that is provided on a free-end side and has a thickness in the vibration direction that decreases toward the free-end side.

7. A portable device mounted with the vibration actuator according to claim 1.

* * * * *